United States Patent
Ye et al.

(10) Patent No.: US 8,737,414 B2
(45) Date of Patent: *May 27, 2014

(54) SCHEDULING, INCLUDING DISTRIBUTED SCHEDULING, FOR A BUFFERED CROSSBAR SWITCH

(75) Inventors: Shunyuan Ye, Brooklyn, NY (US); Yanming Shen, Brooklyn, NY (US); Shivendra S. Panwar, Freehold, NJ (US)

(73) Assignee: Polytechnic Institute of New York University, Brooklyn, NY (US)

(*) Notice: Subject to any disclaimer, the term of this patent is extended or adjusted under 35 U.S.C. 154(b) by 498 days.

This patent is subject to a terminal disclaimer.

(21) Appl. No.: 12/965,650

(22) Filed: Dec. 10, 2010

(65) Prior Publication Data

US 2011/0170558 A1   Jul. 14, 2011

Related U.S. Application Data

(60) Provisional application No. 61/406,207, filed on Oct. 25, 2010, provisional application No. 61/285,229, filed on Dec. 10, 2009.

(51) Int. Cl.
*H04L 12/28* (2006.01)

(52) U.S. Cl.
USPC .................. 370/412; 370/395.42; 370/389

(58) Field of Classification Search
CPC ............ H04L 12/5693; H04L 12/5694; H04L 47/621; H04L 49/3027; H04L 49/3018; H04L 49/1569; H04L 47/50; H04L 42/6215; H04L 42/6275; H04L 49/101
USPC ......... 370/400, 389, 392, 428, 429, 410–412, 370/425–426, 395.21, 395.42, 396–398
See application file for complete search history.

(56) References Cited

U.S. PATENT DOCUMENTS

| | | | |
|---|---|---|---|
| 7,852,866 B2 * | 12/2010 | Chao et al. ................... | 370/412 |
| 2012/0128007 A1 * | 5/2012 | Panwar et al. ................ | 370/412 |
| 2012/0128354 A1 * | 5/2012 | Panwar et al. ................ | 398/45 |

* cited by examiner

*Primary Examiner* — Hanh N Nguyen

(74) *Attorney, Agent, or Firm* — John C. Pokotylo; Straub & Pokotylo

(57) ABSTRACT

Scheduling methods and apparatus are provided for buffered crossbar switches with a crosspoint buffer size as small as one and no speedup. An exemplary distributed scheduling process achieves 100% throughput for any admissible Bernoulli arrival traffic. Simulation results also showed that this distributed scheduling process can provide very good delay performance for different traffic patterns. The simulation results also showed that packet delay is very weakly dependent on the switch size, which implies that the exemplary distributed scheduling process can scale with the number of switch ports.

19 Claims, 19 Drawing Sheets

500

- (P) CROSSPOINT IN PRIORITY SCHEDULE
- (H2) CROSSPOINT IN HAMILTONIAN WALK SCHEDULE
- (P) CROSSPOINT REMOVED (NOT ADDED TO NEXT PRIORITY SCHEDULE)
- (H) CROSSPOINT REMOVED (NOT ADDED TO NEXT PRIORITY SCHEDULE)

600d

SCHEDULING, INCLUDING DISTRIBUTED SCHEDULING, FOR A BUFFERED CROSSBAR SWITCH

§1. RELATED APPLICATIONS

This application claims the benefit of: (1) U.S. Provisional Patent Application Ser. No. 61/285,229 (incorporated herein by reference and referred to as "the '229 provisional"), filed on Dec. 10, 2009, titled "A DISTRIBUTED 100% THROUGHPUT ALGORITHM FOR A BUFFERED CROSSBAR SWITCH," and listing Shunyuan Y E, Yanming SHEN and Shivendra S. PANWAR, and as the inventors; and (2) U.S. Provisional Patent App No. 61/406,207 (incorporated herein by reference and referred to as "the '207 provisional"), titled "DISTRIBUTED SWITCHING METHODS AND APPARATUS: DISQUO, HELIOS AND ALLERTON," filed on Oct. 25, 2010, and listing and listing Shivendra S. PANWAR, Yanming SHEN and Shunyuan Y E as the inventors. The present invention in not limited to requirements of the particular embodiments described in the '229 and '207 provisional applications.

§2. GOVERNMENT FUNDING

The U.S. Government might have a paid-up license in this invention and might have the right in limited circumstances to require the patent owner to license others on reasonable terms as provided for by the terms of Award No. 0435303 awarded by the National Science Foundation.

§3. BACKGROUND OF THE INVENTION

§3.1 Field of the Invention

The present invention concerns switches used in communications networks. More specifically, the present invention concerns scheduling of cells sent through the switching fabric of such a switch.

§3.2 Background Information

The fast growing traffic demand in the Internet requires that packet switches should be simple, fast and efficient. Due to the memory speed limit, most current switches use input queuing ("IQ") or combined input and output queuing ("CIOQ"), with a bufferless crossbar switching fabric. The scheduler must find a matching between inputs and outputs. Such switches require centralized, sometimes complex, algorithms to achieve good performance, such as maximal (See, e.g., the article, J. G. Dai and B. Prabhakar, "The Throughput of Data Switches with and without Speedup," *Proc. of IEEE INFOCOM* (Tel Aviv, Israel, March 2000), incorporated herein by reference.) and maximum weight matching (See, e.g., the article N. McKeown, A. Mekkittikul, V. Anantharam, and J. Walrand, "Achieving 100% Throughput in an Input-Queued Switch," *IEEE Transactions on Communications*, vol. 47, pp. 1260-1267 (August 1999), incorporated herein by reference.). Maximum weight matching can achieve 100% throughput for any admissible arrival traffic, but it is not practical to implement due to its high complexity. Maximal matching, on the other hand, cannot achieve as high a throughput as maximum weight matching.

A number of practical iterative algorithms have been proposed, such as iSLIP (See, e.g., the article, N. Mckeown, "The iSLIP Scheduling Algorithm for Input-Queued Switches," *IEEE/ACM Transactions on Networking*, vol. 7, pp. 188-201 (April 1999), incorporated herein by reference.) and dual round robin matching ("DRRM") (See, e.g., the article, Y. Li, S. Panwar, and H. J. Chao, "On the Performance of a Dual Round-Robin Switch," *Proc. of IEEE INFOCOM* (April 2001), incorporated herein by reference.). iSLIP uses multiple iterations to converge to a maximal matching. DRRM can achieve 100% throughput only under independently and identically distributed ("i.i.d.") and uniform traffic. Exhaustive match with Hamiltonian walk ("EMHW") (See, e.g., the article, Y. Li, S. Panwar, and H. J. Chao, "Exhaustive Service Matching Algorithms for Input Queued Switches," *Proc. of IEEE HPSR* (Phoenix, Ariz., April 2004), incorporated herein by reference.) has been proved to stabilize the system for any admissible traffic, but it is still centralized and has a complexity of $O(\log N)$.

With application specific integrated circuit ("ASIC") technology, it is now possible to add small buffers at each crosspoint inside the crossbar. This makes the buffered crossbar or combined input and crossbar queueing ("CICQ") switch a much more attractive architecture since its scheduler is potentially much simpler. Each input (or output) knows the state of all crosspoint buffers to (or from) which it can send (or receive) packets. The input and output schedulers can be independent. First, each input picks a crosspoint buffer to send a packet to. Then, each output picks a crosspoint buffer to transmit a packet from, as shown in FIG. 1. A centralized scheduler is not needed since the processing can be distributed at each input and output. It has been shown that simple algorithms such as round robin at both the inputs and outputs ("RR-RR") (See, e.g., the article, R. Rojas-Cessa, E. Oki, and H. J. Chao, "On the Combined Input-Crosspoint Buffered Packet Switch with Round-Robin Arbitration," *IEEE Transactions on Communications*, vol. 53, pp. 1945-1951 (November 2005), incorporated herein by reference.), or longest queue first at the inputs, and round robin at the outputs ("LQF-RR") (See, e.g., the article, T. Javidi, R. Magill, and T. Hrabik, "A High Throughput Scheduling Algorithm for a Buffered Crossbar Switch Fabric," *Proc. of IEEE ICC*, (Helsinki, Finland, June 2001), incorporated herein by reference.), can provide 100% throughput under uniform traffic. SQUISH and SQUID (See, e.g., the article, Y. Shen, S. S. Panwar, and H. J. Chao, "Providing 100% Throughput in a Buffered Crossbar Switch," *Proc. of IEEE HPSR*, (Brooklyn, N.Y., May-June 2007), incorporated herein by reference.) can achieve 100% throughput for any admissible traffic, but these are centralized algorithms which do not scale with the increase in the number of ports due to the communication complexity and latency. Thus, these algorithms are generally not implemented in large scale high-speed switching systems.

In view of the foregoing, it would be useful to improve scheduling in switches, such as crosspoint buffered switches.

§4. SUMMARY OF THE INVENTION

Exemplary embodiments consistent with the present invention improve scheduling in switches, such as crosspoint buffered switches for example, by providing a distributed process in which buffered crossbar switches that can stabilize the system under any admissible Bernoulli traffic matrix.

Embodiments consistent with the present invention provide a scheduler and scheduling method for use in a buffered crossbar switch having (1) a plurality of output ports, (2) a plurality of input ports, each of the plurality of input ports having a virtual output queue ("VOQ") corresponding to each of the plurality of output ports, and (3) a switch fabric coupling each of the input ports with each of the output ports, defining crosspoints and including a buffer in the switch fabric at each input port-output port crosspoint. Such a scheduler or scheduling method may do so by (a) accepting an initial priority schedule which defines, for each input port-output port crosspoint$_{i,j}$, whether the crosspoint$_{i,j}$ is in the initial priority schedule or not, wherein, (i) for each input port i, there is at most one crosspoint$_{i,j}$ scheduled in the initial priority schedule, and (ii) for each output port j, there is at most one crosspoint$_{i,j}$ scheduled in the initial priority schedule; (b) generating or receiving a Hamiltonian walk schedule which defines, for each input port-output port crosspoint$_{i,j}$, whether the crosspoint$_{i,j}$ is in the Hamiltonian walk schedule or not; and (c) merging the initial priority schedule with the Hamiltonian walk schedule to define an updated priority schedule. Such a merge should be performed in a manner such that (1) for each crosspoint$_{i,j}$ that is not in the Hamiltonian walk schedule, maintaining a value of the crosspoint$_{i,j}$ in the updated priority schedule as that value of the corresponding crosspoint$_{i,j}$ in the initial priority schedule, and (2) for each crosspoint$_{i,j}$ that is in the Hamiltonian walk schedule, (A) determining whether or not the crosspoint$_{i,j}$ belongs to the initial priority schedule, (B) responsive to a determination that the crosspoint$_{i,j}$ does belong to the initial priority schedule, determining whether or not to maintain the crosspoint$_{i,j}$ in the updated priority schedule based on an occupancy of the j$^{th}$ virtual output queue corresponding to the input port i, and (C) responsive to a determination that the crosspoint$_{i,j}$ does not belong to the initial priority schedule, (i) determining whether or not any neighbor crosspoints$_{k,l}$ of crosspoint$_{i,j}$ belong to the initial priority schedule, (ii) responsive to a determination that a neighbor crosspoint$_{k,l}$ of the crosspoint$_{i,j}$ belongs to the initial priority schedule, determining whether or not to add the crosspoint$_{i,j}$ to the updated priority schedule based on an occupancy of the j$^{th}$ virtual output queue corresponding to the input port i, and (iii) responsive to a determination that a neighbor crosspoint$_{k,l}$ of the crosspoint$_{i,j}$ does not belong to the initial priority schedule, excluding the crosspoint$_{i,j}$ from the updated priority schedule.

In exemplary embodiments consistent with the present invention, no message passing is required. Each input need only use its local queue information and the previous time slot schedule to make its scheduling decision. Simulation results show that it can provide good delay performance as compared to output-queued switches, under different types of traffic.

§5. BRIEF DESCRIPTION OF THE DRAWINGS

Figures 4, 4A:
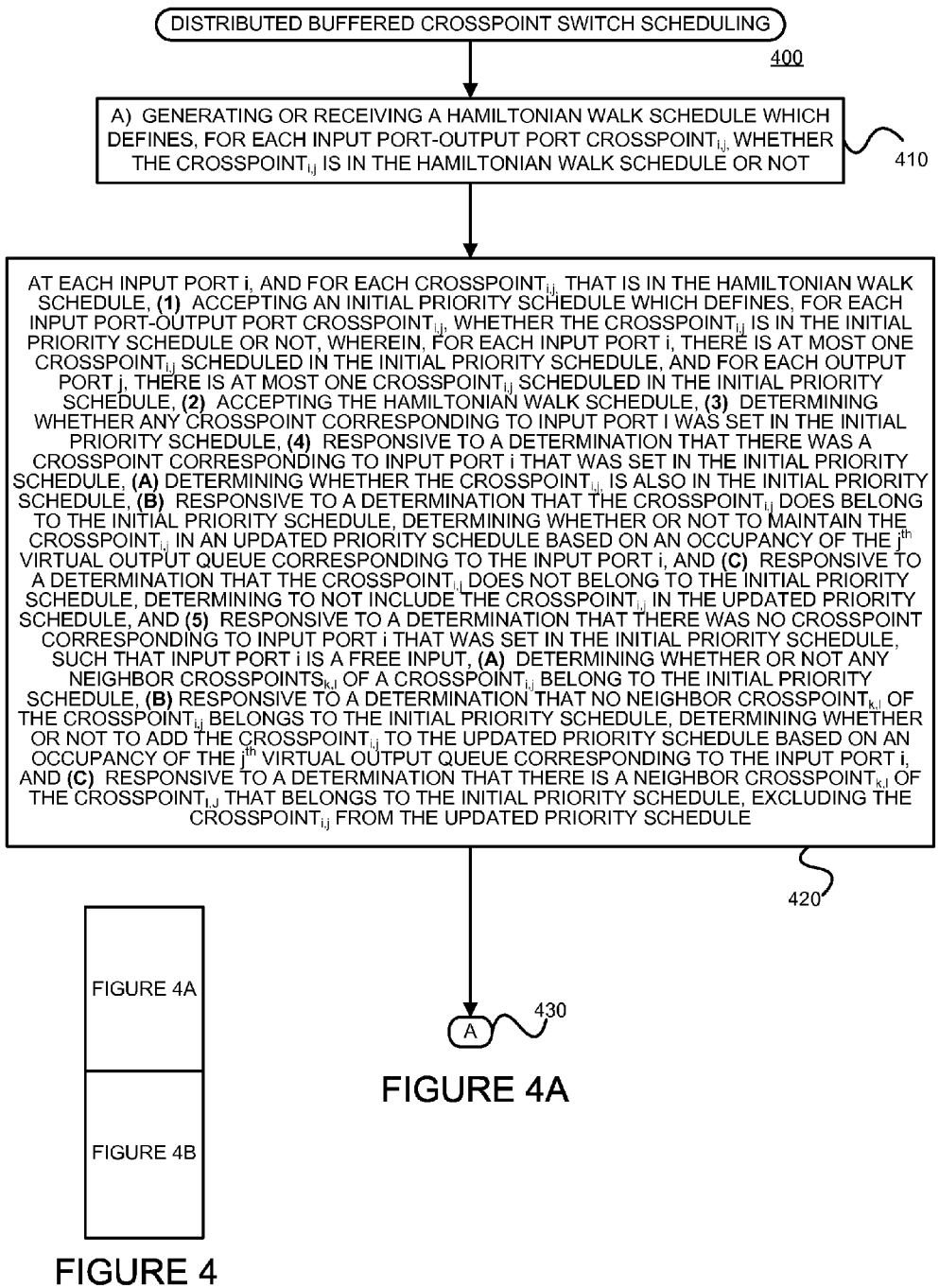
Figure 4B:
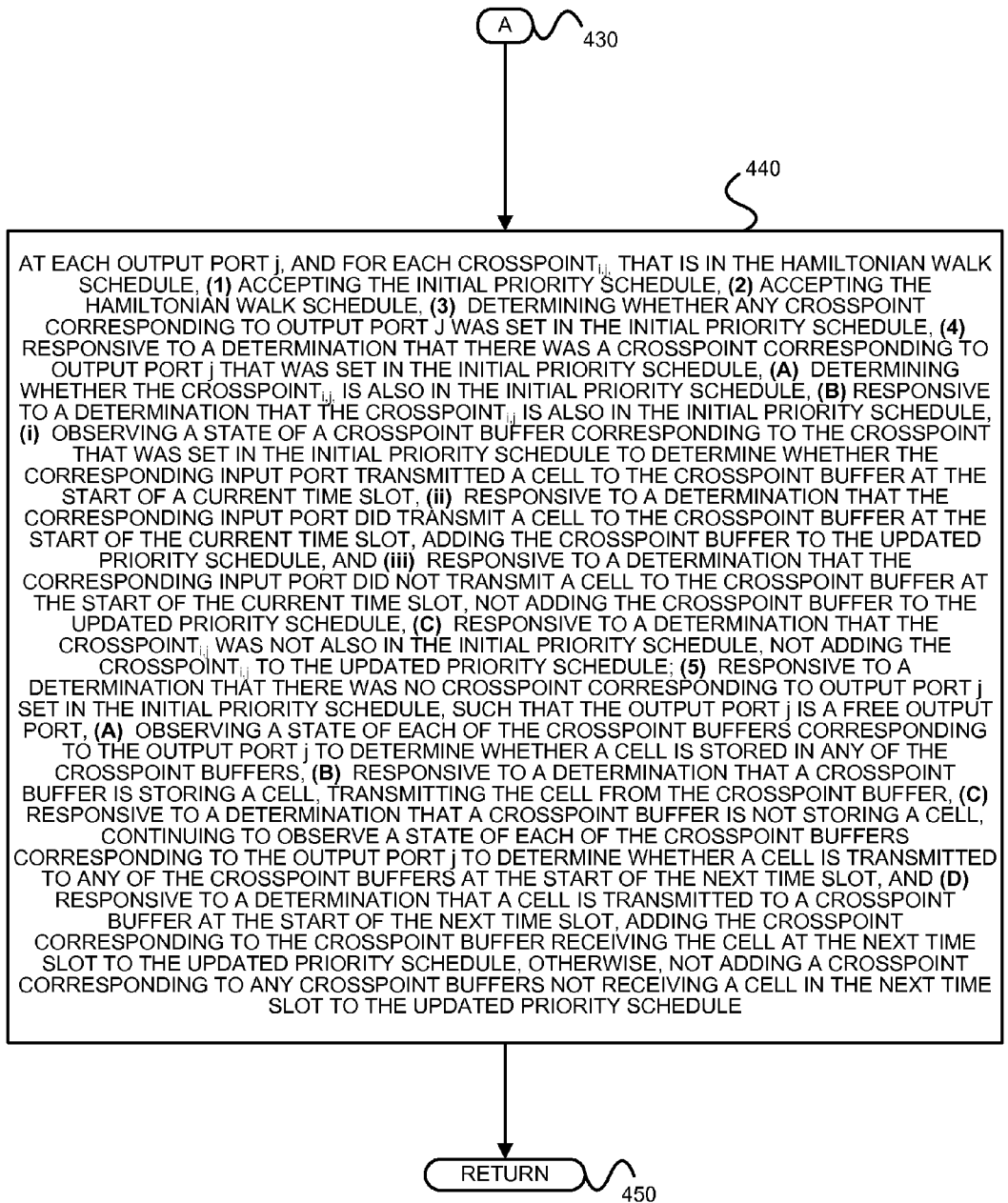

FIG. 4, which includes FIGS. 4A and 4B, is a flow diagram of an exemplary distributed scheduling method consistent with the present invention.

Figure 5:
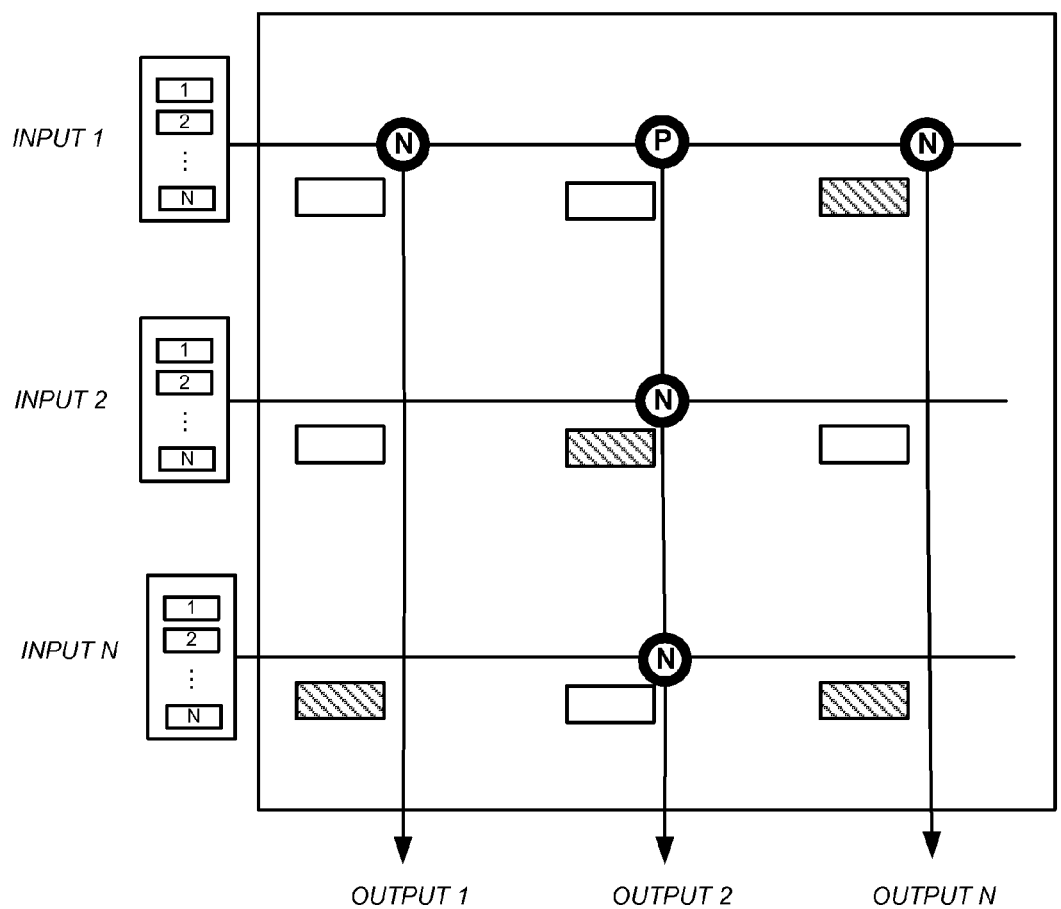

FIG. 5 illustrates the notion of "neighbors" of a crosspoint.

FIGS. 6A-6G illustrate an example of operations of an exemplary scheduling method consistent with the present invention.

FIGS. 7A-7F illustrate an example of operations of an exemplary distributed scheduling method consistent with the present invention.

§6. DETAILED DESCRIPTION

The present invention may involve novel methods, apparatus, message formats, and/or data structures for scheduling the serving of cells in a buffered crossbar switch. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In §6.1 below, an exemplary buffered crossbar switch architecture in which, or with which, embodiments consistent with the present invention may be used, is described. Exemplary apparatus which may be used to implement methods consistent with the present invention are described in §6.2. Then, exemplary methods consistent with the present invention are described in §6.3. Examples illustrating operations of exemplary scheduling methods consistent with the present invention are described in §6.4. Thereafter, some characteristics of at least some of the exemplary embodiments are set forth in §6.5. Finally, some conclusions are presented in §6.6.

§6.1 Exemplary Environment

Buffered Crossbar Switch

Figure 1:
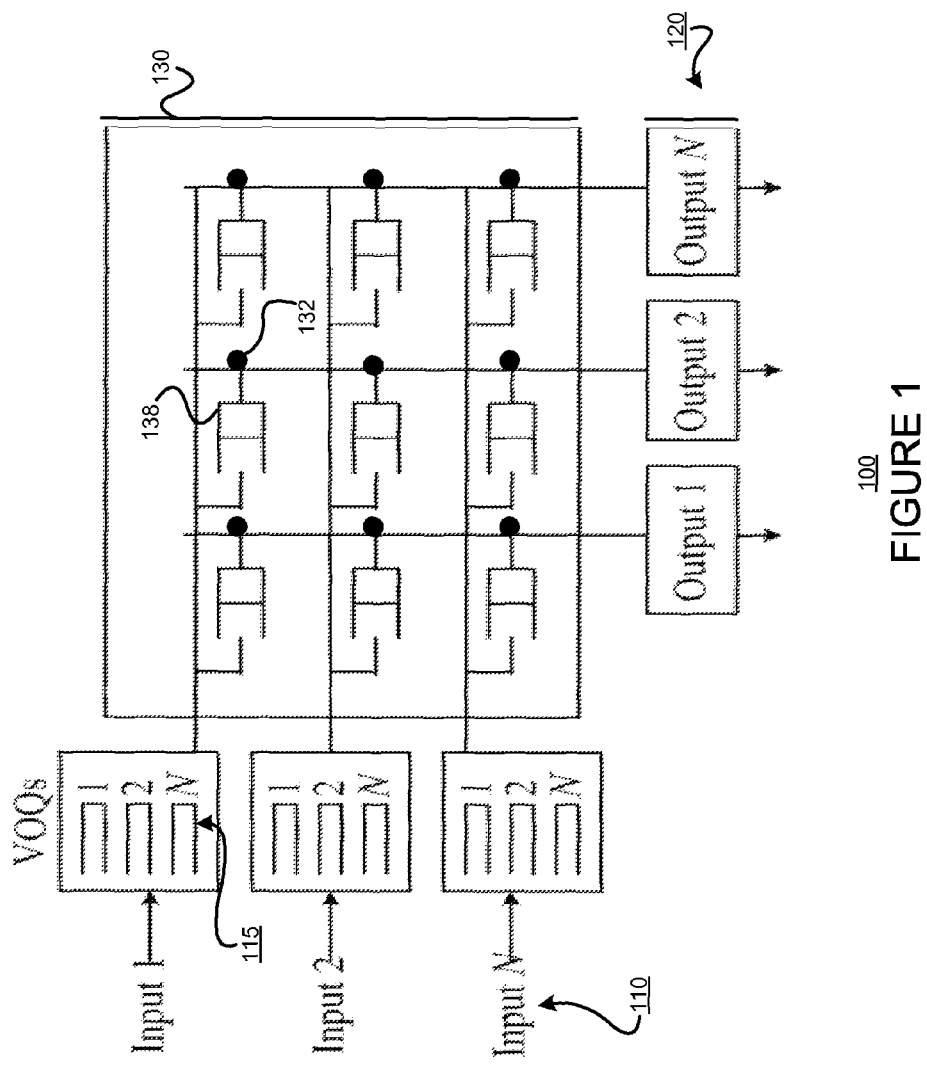
FIG. 1 is a block diagram of a buffered crossbar switch in which each input port has a VOQ corresponding to each of the output ports.

FIG. 1 is a block diagram of an N×N buffered crossbar switch 100 in which each input port 110 has a VOQ 115 corresponding to each of the output ports 120. Fixed size packet (cell) switching is assumed. Variable size packet switching can be implemented by introducing packet segmentation and reassembly. The input ports 110 use VOQs 115 to prevent head-of-line blocking. Specifically, each input port 110 maintains N VOQs 115, one for each output of the N output ports 120. In the following, let $Q_{ij}(n)$ denote the queue length of VOQ$_{ij}$(n) at time n,n=0, 1, . . . . Let (i,j) represent the crosspoint between input i and output j. Note that each VOQ corresponds to a particular crosspoint.

Although an N×N switch is shown in FIG. 1, embodiments consistent with the present invention may be used in switches with different numbers of inputs and outputs.

In the switch fabric 130, each crosspoint 132 contains a finite buffer 138 of size K. In the following, the buffer between input i and output j is denoted as CB$_{ij}$.

The crosspoint buffers 138 function to separate the input contention from the output contention. This allows a two-stage scheduling scheme. For example, each input port 110 may determine which cell is transferred from a VOQ 115 to the corresponding crosspoint buffer 138 with available space. In an output scheduling phase, each output port 120 may determine from which non-empty crosspoint buffer 138 to serve a cell. Cells arrive at the input ports 110 during arrival phase, and cells depart from output ports 120 during departure phase.

When a crosspoint buffer 138 is full, no more cells can be transferred to it. Note that if the crosspoint buffer size is unlimited, the buffered crossbar is equivalent to output queuing, and input schedulers are not necessary because packets can directly go to crosspoint buffers without buffering at inputs. For a practical single-chip implementation using current technology, however, the crosspoint buffers are constrained to a small number.

Each crosspoint has a buffer of size K. (Buffer length K=1 is sufficient for methods consistent with the claimed invention, and most current implementations are constrained in the size of K. It is therefore assumed that K=1 in the following.

Let $CB_{ij}$ denote the buffer of the crosspoint between input i and output j. $B_{ij}(n) \in \{0, 1\}$ denotes the occupancy of $CB_{ij}$ at time n.

A schedule can be represented by $S(n)=[S^I(n), S^O(n)]$. $S^I(n)=[S_{ij}^I(n)]$ is the input schedule. Each input port can only transmit at most one cell at each time slot. Thus the input schedule is subject to the following constraints:

$$\Sigma_j S_{ij}^I(n) \leq 1, S_{ij}^I(n)=0 \text{ if } B_{ij}(n)=1 \qquad (1)$$

$S^O(n)=[S_{ij}^O(n)]$ is the output schedule. It has to satisfy the following constraints:

$$\Sigma_i S_{ij}^O(n) \leq 1, S_{ij}^O(n)-0 \text{ if } B_{ij}(n)=0 \qquad (2)$$

Let $\lambda_{ij}$ represent the arrival rate of traffic between input i and output j. Assume that the arrival process is Bernoulli.

Definition 1: An arrival process is said to be admissible if it satisfies:

$$\Sigma_j \lambda_{ij} < 1, \text{ and } \Sigma_i \lambda_{ij} < 1 \qquad (3)$$

§6.2 Exemplary Apparatus

Embodiments consistent with the present invention might be implemented in hardware, such as one or more field programmable gate arrays (FPGAs), one or more integrated circuits such as an application specific integrated circuit (ASICs), one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.).

Figure 2:
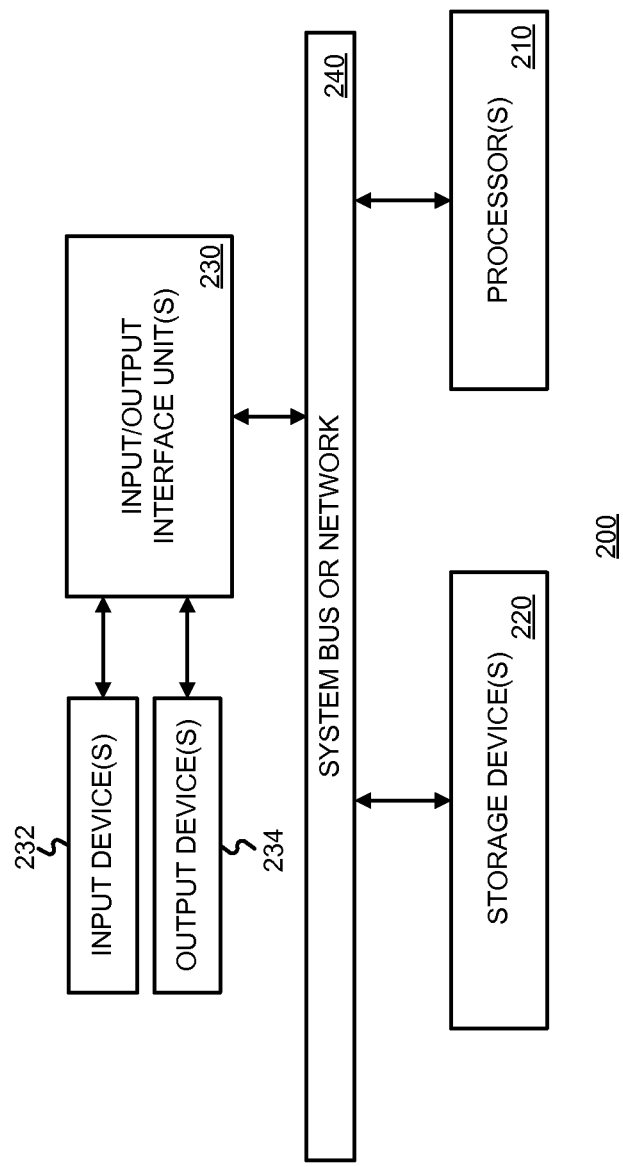
FIG. 2 is a block diagram of an exemplary apparatus that may perform various operations, and store various information generated and/or used by such operations, in a manner consistent with the present invention.

FIG. 2 is high-level block diagram of an exemplary machine 200 that may perform one or more of the processes described above, and/or store information used and/or generated by such processes. The exemplary machine 200 basically includes one or more processors 210, one or more input/output interface units 230, one or more storage devices 220, and one or more system buses and/or networks 240 for facilitating the communication of information among the coupled elements. One or more input devices 232 and one or more output devices 234 may be coupled with the one or more input/output interfaces 230. The one or more processors 210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 220 and/or may be received from an external source via one or more input interface units 230.

In some embodiments consistent with the present invention, the processing units 210 may be one or more microprocessors. The bus 240 may include a system bus. The storage devices 220 may include system memory, such as read only memory (ROM) and/or random access memory (RAM). The storage devices 220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§6.3 Exemplary Scheduling Methods

A scheduling method consistent with the present invention is first described with reference to FIG. 3. Then, an exemplary distributed embodiment is described with reference to FIG. 4 in §6.3.1.

Figure 3:
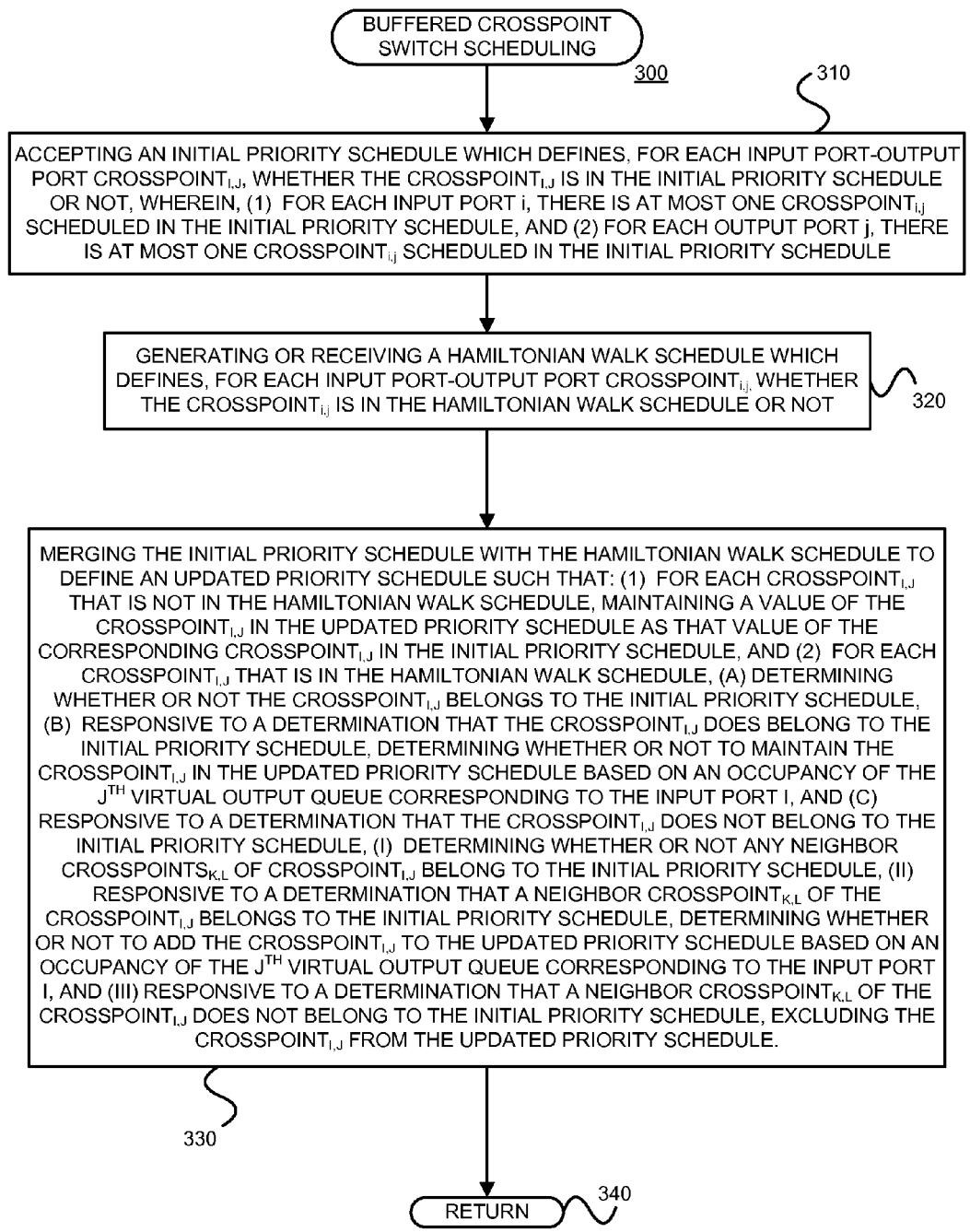
FIG. 3 is a flow diagram of an exemplary scheduling method consistent with the present invention.

FIG. 3 is a flow diagram of an exemplary scheduling method 300 consistent with the present invention. The scheduling method of FIG. 3 may be used with a buffered crossbar switch having (1) a plurality of output ports, (2) a plurality of input ports, each of the plurality of input ports having a virtual output queue corresponding to each of the plurality of output ports, and (3) a switch fabric coupling each of the input ports with each of the output ports, defining crosspoints and including a buffer in the switch fabric at each input port-output port crosspoint. As shown, an initial priority schedule which defines, for each input port-output port $crosspoint_{i,j}$, whether the $crosspoint_{i,j}$ is in the initial priority schedule or not, is accepted. (Block 310) In the initial priority schedule, (1) for each input port i, there is at most one $crosspoint_{i,j}$ scheduled in the initial priority schedule, and (2) for each output port j, there is at most one $crosspoint_{i,j}$ scheduled in the initial priority schedule. A Hamiltonian walk schedule which defines, for each input port-output port $crosspoint_{i,j}$ whether the $crosspoint_{i,j}$ is in the Hamiltonian walk schedule or not, is generated or received. (Block 320) Finally, the initial priority schedule is merged with the Hamiltonian walk schedule to define an updated priority schedule such that:

(1) for each $crosspoint_{i,j}$ that is not in the Hamiltonian walk schedule, maintaining a value of the $crosspoint_{i,j}$ in the updated priority schedule as that value of the corresponding $crosspoint_{i,j}$ in the initial priority schedule, and (2) for each $crosspoint_{i,j}$ that is in the Hamiltonian walk schedule, (A) determining whether or not the $crosspoint_{i,j}$ belongs to the initial priority schedule, (B) responsive to a determination that the $crosspoint_{i,j}$ does belong to the initial priority schedule, determining whether or not to maintain the $crosspoint_{i,j}$ in the updated priority schedule based on an occupancy of the $j^{th}$ virtual output queue corresponding to the input port i, and (C) responsive to a determination that the $crosspoint_{i,j}$ does not belong to the initial priority schedule, (i) determining whether or not any neighbor $crosspoints_{k,l}$ of $crosspoint_{i,j}$ belong to the initial priority schedule, (ii) responsive to a determination that a neighbor $crosspoint_{k,l}$ of the $crosspoint_{i,j}$ belongs to the initial priority schedule, determining whether or not to add the $crosspoint_{i,j}$ to the updated priority schedule based on an occupancy of the $j^{th}$ virtual output queue corresponding to the input port i, and (iii) responsive to a determination that a neighbor $crosspoint_{k,l}$ of the $crosspoint_{i,j}$ does not belong to the initial priority schedule, excluding the $crosspoint_{i,j}$ from the updated priority schedule.

In at least some embodiments consistent with the present invention, crosspoint buffer is a single cell buffer.

Referring back to block 330, as shown in FIG. 5, a crosspoint is a "neighbor" of $crosspoint_{i,j}$ if the crosspoint has the same input port i but a different output port $\bar{j}$ than the output port j, or the same output port j but a different input port $\bar{i}$ than the input port i.

Referring back to block 330, the act of determining whether or not to add the crosspoint$_{i,j}$ in the updated priority schedule based on the occupancy of the $j^{th}$ virtual output queue corresponding to the input port i, (1) determines a weight of the $j^{th}$ virtual output queue corresponding to the input i as a function of the occupancy of the queue, (2) determines a probability $$p_{i,j} = \frac{e^{weight_{i,j}}}{1+e^{weight_{i,j}}},$$

and (3) adds the crosspoint$_{i,j}$ to the updated priority schedule with a probability $p_{i,j}$, and otherwise does not add crosspoint$_{i,j}$ to the updated priority schedule.

In other embodiments consistent with the present invention, the act of determining whether or not to add the crosspoint$_{i,j}$ to the updated priority schedule based on the occupancy of the $j^{th}$ virtual output queue corresponding to the input port i, (1) determines a probability $p_{i,j}$ as a concave function of the occupancy of the $j^{th}$ virtual output queue corresponding to the input i, and (2) adds the crosspoint$_{i,j}$ to the updated priority schedule with a probability $p_{i,j}$, and otherwise does not add the crosspoint$_{i,j}$ to the updated priority schedule.

The scheduling method 300 is typically run multiple times (e.g., once per cell time slot). Thus, the scheduling method may further include generating or receiving a second Hamiltonian walk schedule which defines, for each input port-output port crosspoint$_{i,j}$ whether the crosspoint$_{i,j}$ is in the second Hamiltonian walk schedule or not; and merging the updated priority schedule with the second Hamiltonian walk schedule to define a further updated priority schedule such that:

(1) for each crosspoint$_{i,j}$ that is not in the second Hamiltonian walk schedule, maintaining a value of the crosspoint$_{i,j}$ in the further updated priority schedule as that value of the corresponding crosspoint$_{i,j}$ in the updated priority schedule, and (2) for each crosspoint$_{i,j}$ that is in the second Hamiltonian walk schedule, (A) determining whether or not the crosspoint$_{i,j}$ belongs to the updated priority schedule, (B) responsive to a determination that the crosspoint$_{i,j}$ does belong to the updated priority schedule, determining whether or not to maintain the crosspoint$_{i,j}$ in the further updated priority schedule based on an occupancy of the $j^{th}$ virtual output queue corresponding to the input port i, and (C) responsive to a determination that the crosspoint$_{i,j}$ does not belong to the updated priority schedule, (i) determining whether or not any neighbor crosspoints$_{k,l}$ of crosspoint$_{i,j}$ belong to the updated priority schedule, (ii) responsive to a determination that a neighbor crosspoint$_{k,l}$ of the crosspoint$_{i,j}$ belongs to the updated priority schedule, determining whether or not to add the crosspoint$_{i,j}$ to the further updated priority schedule based on an occupancy of the $j^{th}$ virtual output queue corresponding to the input port i, and (iii) responsive to a determination that a neighbor crosspoint$_{k,l}$ of the crosspoint$_{i,j}$ does not belong to the updated priority schedule, excluding the crosspoint$_{i,j}$ from the further updated priority schedule.

Stated differently, an exemplary scheduling process consistent with the present invention is provided here. First, notation used in describing a process consistent with the present invention is described.

Definition 2: A DISQUO priority schedule X(n) is an N×N matrix, where $X_{ij}(n) \in \{0, 1\}$, and $\Sigma_i X_{ij}(n) \leq 1$, $\Sigma_j X_{ij}(n) \leq 1$.

With some abuse of notation, X is also used to represent a set, and write $(i, j) \in X$ if $X_{ij}=1$. Note that a DISQUO priority schedule X has the property that if $X_{ij}=1$, then $\forall i' \neq i$, $X_{i'j}=0$ and $\forall j' \neq j$, $X_{ij'}=0$. These crosspoints are defined as its neighbors.

Definition 3: For a crosspoint (i,j), its neighbors are defined as:

$$N(i,j) = \{(i',j) \text{ or } (i,j') | \forall i' \neq i, \forall j' \neq j\} \quad (4)$$

In addition, an exemplary DISQUO priority schedule X consistent with the present invention has the following properties:

Property 1: If $(i,j) \in X$, $\forall (k, l) \in N(i, j)$, $(k, l) \notin X$. The DISQUO priority schedule has the following properties:

Property 2: At each time slot, when a DISQUO priority schedule is generated, each input and output port determine their schedules by observing the following rules:

For input i, when $X_{ij}(n)=1$, if $Q_{ij}(n)>0$ and $B_{ij}(n-1)=0$, then $S_{ij}^I(n)=1$.

Otherwise, $S_{ij}^I(n)=0$.

For output j, if $X_{ij}(n)=1$ and $B_{ij}(n)>0$, $S_{ij}^O(n)=1$.

Property 3: For an input i, if $\forall j$, $X_{ij}=0$, then it is referred to as a free input. A free input port can randomly pick an eligible crosspoint to serve, i.e. it can transfer a packet to any free crosspoint buffer.

Property 4: For an output port j, if $\forall i$, $X_{ij}=0$, then it is a free output. A free output can randomly pick a non-empty crosspoint to serve.

Let $\chi$ represent the set of all DISQUO priority schedules.

Referring back to 310 of FIG. 3, the initial DISQUO priority schedule X(0) can be any schedule that satisfies Definition 2. For a switch of size N, there are N! distinct matchings. Referring back to 320 of FIG. 3, a Hamiltonian walk schedule H(n) visits each of the N! distinct matchings exactly once during N! slots. A distributed Hamiltonian walk can be simply generated with a time complexity of O(1) (See, e.g., the article, P. Giaccone, B. Prabhakar, and D. Shah, "Toward Simple, High Performance Schedulers for High-Aggregate Bandwidth Switches," *Proc. of IEEE INFOCOM*, (New York, 2002), incorporated herein by reference.). Note that H(n) is also a DISQUO priority schedule.

Finally, referring back to block 330 of FIG. 3, the DISQUO priority schedule X(n) may then be generated by "merging" X(n−1) and H(n) as follows:

Basic DISQUO Scheduling Process Pseudo Code $\forall (i,j) \notin H(n)$:

(a) $X_{ij}(n) = X_{ij}(n-1)$.

For $(i,j) \in H(n)$:

If $(i,j) \in X(n-1)$:

(b) $X_{ij}(n)=1$ with probability $p_{ij}$;

(c) $X_{ij}(n)=0$ with probability $\bar{p}_{ij}=1-p_{ij}$.

If $(i,j) \notin X(n-1)$, and $\forall (k,l) \in N(i,j)$, $X_{kl}(n-1)=0$, then:
(d) $X_{ij}(n)=1$ with probability $\underline{p}_{ij}$;
(e) $X_{ij}(n)=0$ with probability $\underline{\overline{p}}_{ij}=1-\underline{p}_{ij}$.
Else, if $(i,j) \notin X(n-1)$, and $\exists (k,l) \in N(i,j)$ such that $X_{kl}(n-1)=1$:
(f) $X_{ij}(n)=0$.

In at least some embodiments consistent with the present invention, the probability $p_{ij}$ is a concave function (to be specified later) of the queue size $Q_{ij}$ such that when $Q_{ij}=0$, $p_{ij}=0$. Note that in the foregoing, $X_{ij}(n)$ can change only when the $VOQ_{ij}$ is selected by $H(n)$.

§6.3.1 Distributed Implementation

FIG. 4, which includes FIGS. 4A and 4B, is a flow diagram of an exemplary distributed scheduling method 400 consistent with the present invention. The scheduling method 400 of FIG. 4 may be used with a buffered crossbar switch having (1) a plurality of output ports, (2) a plurality of input ports, each of the plurality of input ports having a virtual output queue corresponding to each of the plurality of output ports, and (3) a switch fabric coupling each of the input ports with each of the output ports, defining crosspoints and including a buffer in the switch fabric at each input port-output port crosspoint. As shown, a Hamiltonian walk schedule which defines, for each input port-output port crosspoint$_{i,j}$, whether the crosspoint$_{i,j}$ is in the Hamiltonian walk schedule or not, is generated or received. (Block 410). At each input port i, and for each crosspoint$_{i,j}$, that is in the Hamiltonian walk schedule, the method 400

(1) accepts an initial priority schedule which defines, for each input port-output port crosspoint$_{i,j}$, whether the crosspoint$_{i,j}$ is in the initial priority schedule or not, wherein, (i) for each input port i, there is at most one crosspoint$_{i,j}$ scheduled in the initial priority schedule, and (ii) for each output port j, there is at most one crosspoint$_{i,j}$ scheduled in the initial priority schedule, (2) accepts the Hamiltonian walk schedule, (3) determines whether any crosspoint corresponding to input port i was set in the initial priority schedule, (4) responsive to a determination that there was a crosspoint corresponding to input port i that was set in the initial priority schedule, A) determines whether the crosspoint$_{i,j}$, is also in the initial priority schedule, (B) responsive to a determination that the crosspoint$_{i,j}$ does belong to the initial priority schedule, determines whether or not to maintain the crosspoint$_{i,j}$ in an updated priority schedule based on an occupancy of the $j^{th}$ virtual output queue corresponding to the input port i, and (C) responsive to a determination that the crosspoint$_{i,j}$ does not belong to the initial priority schedule, determines to not include the crosspoint$_{i,j}$ in the updated priority schedule, and (5) responsive to a determination that there was no crosspoint corresponding to input port i that was set in the initial priority schedule, such that input port i is a free input, (A) determines whether or not any neighbor crosspoints$_{k,l}$ of a crosspoint$_{i,j}$ belong to the initial priority schedule, (B) responsive to a determination that no neighbor crosspoint$_{k,l}$ of the crosspoint$_{i,j}$ belongs to the initial priority schedule, determines whether or not to add the crosspoint$_{i,j}$ to the updated priority schedule based on an occupancy of the $j^{th}$ virtual output queue corresponding to the input port i, and (C) responsive to a determination that there is a neighbor crosspoint$_{k,l}$ of the crosspoint$_{i,j}$ that belongs to the initial priority schedule, excludes the crosspoint$_{i,j}$ from the updated priority schedule.

(Block 420) The method 400 continues, via node A (430), from FIG. 4A to FIG. 4B. As shown in FIG. 4B, at each output port j, and for each crosspoint$_{i,j}$, that is in the Hamiltonian walk schedule, the method 400

(1) accepts the initial priority schedule, (2) accepts the Hamiltonian walk schedule, (3) determines whether any crosspoint corresponding to output port j was set in the initial priority schedule, (4) responsive to a determination that there was a crosspoint corresponding to output port j that was set in the initial priority schedule, (A) determines whether the crosspoint$_{i,j}$, is also in the initial priority schedule, (B) responsive to a determination that the crosspoint$_{i,j}$ is also in the initial priority schedule, (i) observes a state of a crosspoint buffer corresponding to the crosspoint that was set in the initial priority schedule to determine whether the corresponding input port transmitted a cell to the crosspoint buffer at the start of a current time slot, (ii) responsive to a determination that the corresponding input port did transmit a cell to the crosspoint buffer at the start of the current time slot, adds the crosspoint buffer to the updated priority schedule, and (iii) responsive to a determination that the corresponding input port did not transmit a cell to the crosspoint buffer at the start of the current time slot, does not add the crosspoint buffer to the updated priority schedule, (C) responsive to a determination that the crosspoint$_{i,j}$ was not also in the initial priority schedule, does not add the crosspoint$_{i,j}$ to the updated priority schedule;

(5) responsive to a determination that there was no crosspoint corresponding to output port j set in the initial priority schedule, such that the output port j is a free output port, (A) observes a state of each of the crosspoint buffers corresponding to the output port j to determine whether a cell is stored in any of the crosspoint buffers, (B) responsive to a determination that a crosspoint buffer is storing a cell, transmits the cell from the crosspoint buffer, (C) responsive to a determination that a crosspoint buffer is not storing a cell, continues to observe a state of each of the crosspoint buffers corresponding to the output port j to determine whether a cell is transmitted to any of the crosspoint buffers at the start of the next time slot, and (D) responsive to a determination that a cell is transmitted to a crosspoint buffer at the start of the next time slot, adds the crosspoint corresponding to the crosspoint buffer receiving the cell at the next time slot to the updated priority schedule, otherwise, does not add a crosspoint corresponding to any crosspoint buffers not receiving a cell in the next time slot to the updated priority schedule. (Block 440)

The exemplary DISQUO priority schedule X consistent with the present invention has the four properties listed above in §6.3.

In at least some examples of the exemplary method 400, each crosspoint buffer may be a multi-cell buffer. However, an advantageous aspect of embodiments consistent with the present invention is that this is not required. Thus, each crosspoint buffer may be a single cell buffer.

In at least some examples of the exemplary method 400, a crosspoint is a neighbor of crosspoint$_{i,j}$ if the crosspoint has the same input port i but a different output port $\bar{j}$ than the output port j, or the same output port j but a different input port $\bar{i}$ than the input port i.

In at least some examples of the exemplary method 400, the act of determining whether or not to add the crosspoint$_{i,j}$ in the updated priority schedule based on the occupancy of the $j^{th}$ virtual output queue corresponding to the input port i, may (1) determine a weight of the $j^{th}$ virtual output queue corresponding to the input i as a function of the occupancy of the queue, (2) determine a probability $$p_{i,j} = \frac{e^{weight_{i,j}}}{1 + e^{weight_{i,j}}},$$

and (3) add the crosspoint$_{i,j}$ to the updated priority schedule with a probability $p_{i,j}$, and otherwise does not add crosspoint$_{i,j}$ to the updated priority schedule.

In at least some other examples of the exemplary method 400, the act of determining whether or not to add the crosspoint$_{i,j}$ to the updated priority schedule based on the occupancy of the $j^{th}$ virtual output queue corresponding to the input port i, may (1) determine a probability as a concave function of the occupancy of the $j^{th}$ virtual output queue corresponding to the input i, and (2) add the crosspoint$_{i,j}$ to the updated priority schedule with a probability $p_{i,j}$, and otherwise does not add the crosspoint$_{i,j}$ to the updated priority schedule.

In an exemplary process consistent with the present invention, each input i only needs to track the DISQUO priority schedule in the previous time slot (i.e. for which output j was $X_{ij}(n-1)=1$). Similarly, each output only needs to track for which input i was $X_{ij}(n-1)=1$. Since the process is distributed, there needn't be any explicit message passing between inputs and outputs. However, the exemplary process ensures that if $X_{ij}(n)=1$, both input i and output j are aware of this. Then the inputs and outputs can keep a consistent view of the DISQUO priority schedule. The exemplary distributed scheduling process works as follows.

Distributed DISQUO Scheduling Process Pseudo Code

Input Scheduling Decisions

At each input port i, assume (i,j) is selected by H(n). (If (i,j) is not selected by H(n), then $X_{ij}(n)=X_{ij}(n-1)$.)

If there exists a j', with $X_{ij}'(n-1)=1$:
 If j=j', (i,j)∈X(n-1) and (i,j)∈H(n):
  (a) $X_{ij}(n)=1$ with probability $p_{ij}$;
  (b) $X_{ij}(n)=0$ with probability $\bar{p}_{ij}=1-p_{ij}$.
 Else,
  (c) $X_{ij}(n)=0$.
Else, if there is no j' such that $X_{ij}(n-1)=1$, then input i is a "free input", and:
 If ∀(k, l)∈N(i,j), $X_{kl}(n-1)=0$ (We will explain later how an input port can learn this):
  (d) $X_{ij}(n)=1$ with probability $p_{ij}$;
  (e) $X_{ij}(n)=0$ with probability $\bar{p}_{ij}=1-p_{ij}$.
 Else,
  (f) $X_{ij}(n)=0$.

Output Scheduling Decisions

Without explicit messaging, each output port j learns the scheduling decision made by the input. Assume (i,j) is selected by H(n).

If there exists an i', with $X_{ij}'(n-1)=1$:
 If i=i', (i,j)∈X(n-1) and (i,j)∈H(n).
 As shown above, input i may change $X_{ij}$ from 1 to 0. Therefore, without explicit messaging, output j has to observe the crosspoint buffer to learn the input's decision.
  (a) If input i transmits a packet to $CB_{ij}$ at the beginning of time n, $X_{ij}(n)=1$
  (b) Otherwise, $X_{ij}(n)=0$.
 Else,
  (c) $X_{ij}(n)=X_{ij}(n-1)=0$
Else, if there is no i' such that $X_{ij}(n-1)=1$, then output j is a "free output", and:
 (i) If the buffer at crosspoint (i,j) is empty and input i sends a packet to $CB_{ij}$ at the beginning of time slot n; or (ii) if the buffer is not empty, output j will transmit this packet from $CB_{ij}$ at time slot n, and if then input i sends a packet to $CB_{ij}$ at the beginning of time slot n+1, output j can update its schedule of time n as:
  (d) $X_{ij}(n)=1$.
 Else,
  (e) $X_{ij}(n)=0$.

So in the exemplary distributed scheduling process set forth in the foregoing pseudo code, the inputs are making the scheduling decisions and updating the DISQUO priority schedule based on H(n). Without explicit messaging, the output ports have to learn the scheduling decisions of the inputs. However, by observing crosspoint buffers, an input and an output can learn each other's decisions implicitly, without the need for explicit messaging. As stated in the foregoing pseudo code, if a free input decides to set $X_{ij}(n)=1$ from $X_{ij}(n-1)=0$, it has to make sure that output j was also free so that there does not exist any (k, l)∈N(i,j) such that $X_{kl}(n-1)=1$. The input can learn whether output j was "free" or not by observing the crosspoint buffer $CB_{ij}$. If it is served by output port j at time slot n, input i learns that the output was "free" at time slot n−1 and confirms that ∀(k, l)∈N(i,j), $X_{kl}(n-1)=0$.

§6.4 Examples of Exemplary Scheduling Method Consistent with the Present Invention Both the '229 and '207 provisional applications provided an illustrative example to help explain the exemplary distributed scheduling process. Recall that the input actions are performed at the beginning of each time slot (denoted by a "−" following the time slot), and the outputs transmit packets from the crosspoint buffers before the end of each time slot (denoted by a "+" following the time slot).

In FIG. 2(a) of the '229 and '207 provisional applications, the DISQUO priority schedule is X(n−1)={(1, 2), (2, 1)} and the Hamiltonian walk schedule is H(n)={(1, 1), (2, 3), (3, 2)}. For input 1, $X_{12}(n-1)=1$ and (1, 2) is not selected by H(n), so $X_{12}(n)=X_{12}(n-1)=1$. Similarly, $X_{21}(n)=1$. Input 3 is free and since (3, 2) is selected, it decides to send a packet to $CB_{32}$ with probability $p_{32}$, and it will observe $CB_{32}$ to see if output 2 is also free. However, output 2 is not free, thus the packet in $CB_{32}$ will not be transmitted. Input 3 can observe this by the end of time n. Thus, $X_{32}(n)=0$. Thus, as shown in FIG. 2(b), the DISQUO priority schedule at time n is still X(n)={(1, 2), (2, 1)}.

Referring to FIGS. 2(c) and 2(d) of the '229 and '207 provisional applications, a time n+1, H(n+1)={(1, 2), (2, 1), (3, 3)}. Both (1, 2) and (2, 1) are selected by H(n+1). So input 1 and 2 change their schedules with probability $\bar{p}_{12}=1-p_{12}$ and $\bar{p}_{21}=1-p_{21}$. In the example, inputs 1 and 2 both decide to change their schedules and stop sending packets to $CB_{12}$ and $CB_{21}$. Therefore, as shown in FIG. 2(d), $X_{12}(n+1)=0$ and $X_{21}(n+1)=0$. Output 2 and output 1 can learn this by observing $CB_{12}$ and $CB_{21}$, respectively. Input 3 is free and (3, 3) is selected by H(n+1). Therefore, input 3 sends a packet to $CB_{33}$ with probability $p_{33}$. In this example, input 3 does send a packet to $CB_{33}$. Output 3 is free and it learns that $X_{33}(n+1)=1$ by observing $CB_{33}$. Therefore output 3 transmits the packet from $CB_{33}$ at time n, which is observed by input 3 and it confirms that output 3 is also free. Then the DISQUO priority schedule becomes $X(n+1)=\{(3, 3)\}$, as shown FIG. 2(d).

Referring to FIGS. 2(e) and 2(f) of the '229 and '207 provisional applications, at time n+2, $H(n+2)=\{(1, 1), (2, 3), (3, 2)\}$. Input 1 is free, and $(1, 1)$ is selected by $H(n+2)$. So it sends a packet to $CB_{11}$ with probability $p_{11}$. Output 1 is also free, and it learns that $X_{11}(n+2)=1$ by observing $CB_{11}$. The packet then is transmitted by output 1, and input 1 confirms that output 1 is free. So, $X_{11}(n+2)=1$. Input 2 is free and since $(2, 3)$ is selected by $H(n+2)$, it has to decide whether to send a packet to $CB_{23}$ or not with probability $p_{23}$. As we can see, input 2 decides not to send a packet to $CB_{23}$, therefore $X_{23}(n+2)=0$. Crosspoint $(3, 3)$ is not in $H(n+2)$, so $X_{33}(n+2)=X_{33}(n+1)=1$. The DISQUO priority schedule then is $X(n+2)=\{(1, 1), (3, 3)\}$ as shown in FIG. 2(f).

FIGS. 6A-6G illustrate an example of operations of an exemplary scheduling method consistent with the basic DISQUO scheduling process pseudo code and properties set forth in §6.3 above. However, for clarity, the transmission of cells to and from crosspoint buffers is not shown. Conditions (a)-(f) of the pseudo code are referenced. In these Figures, N=3.

Figure 6A:
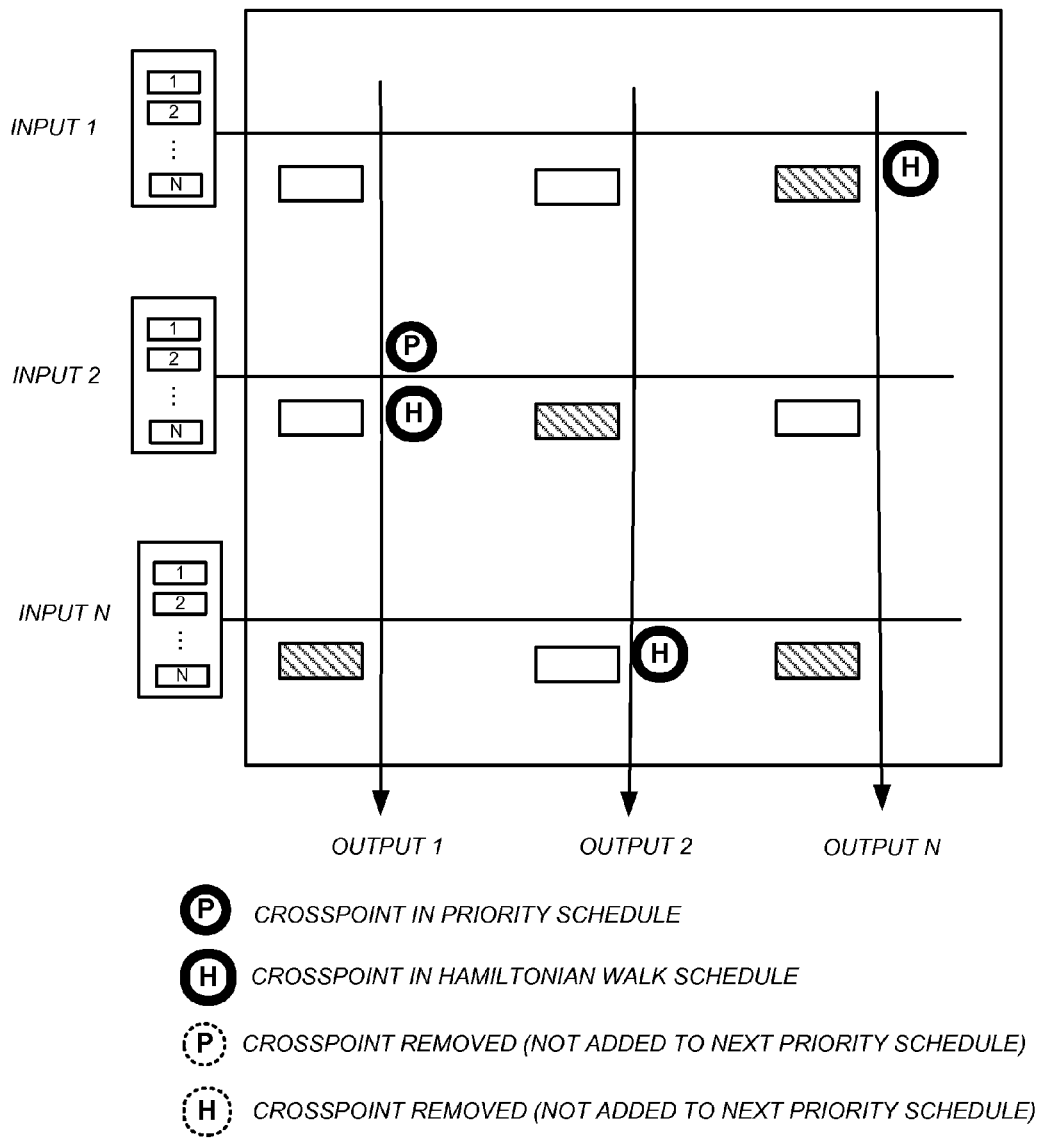
Figure 6B:
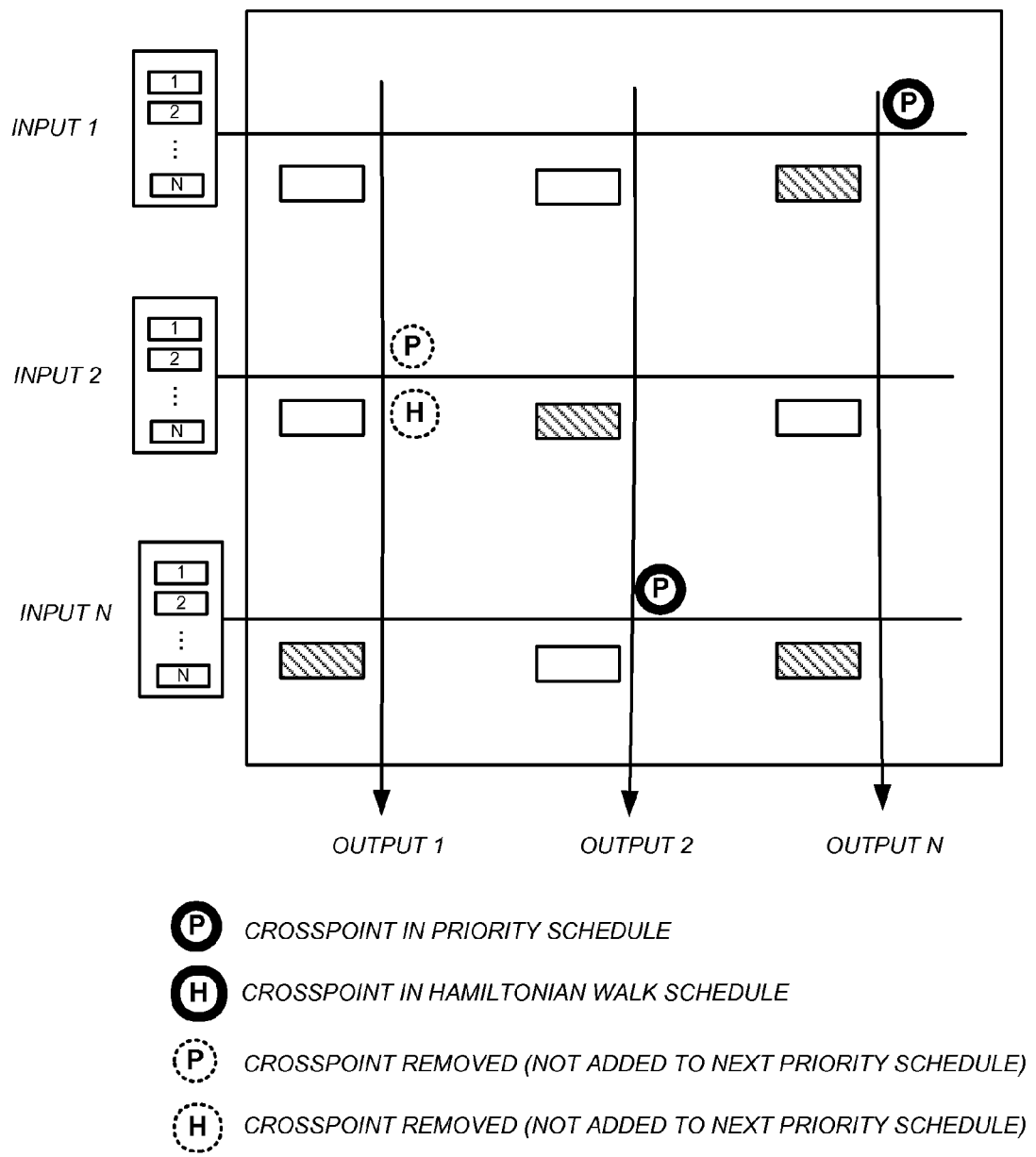
Figure 6C:
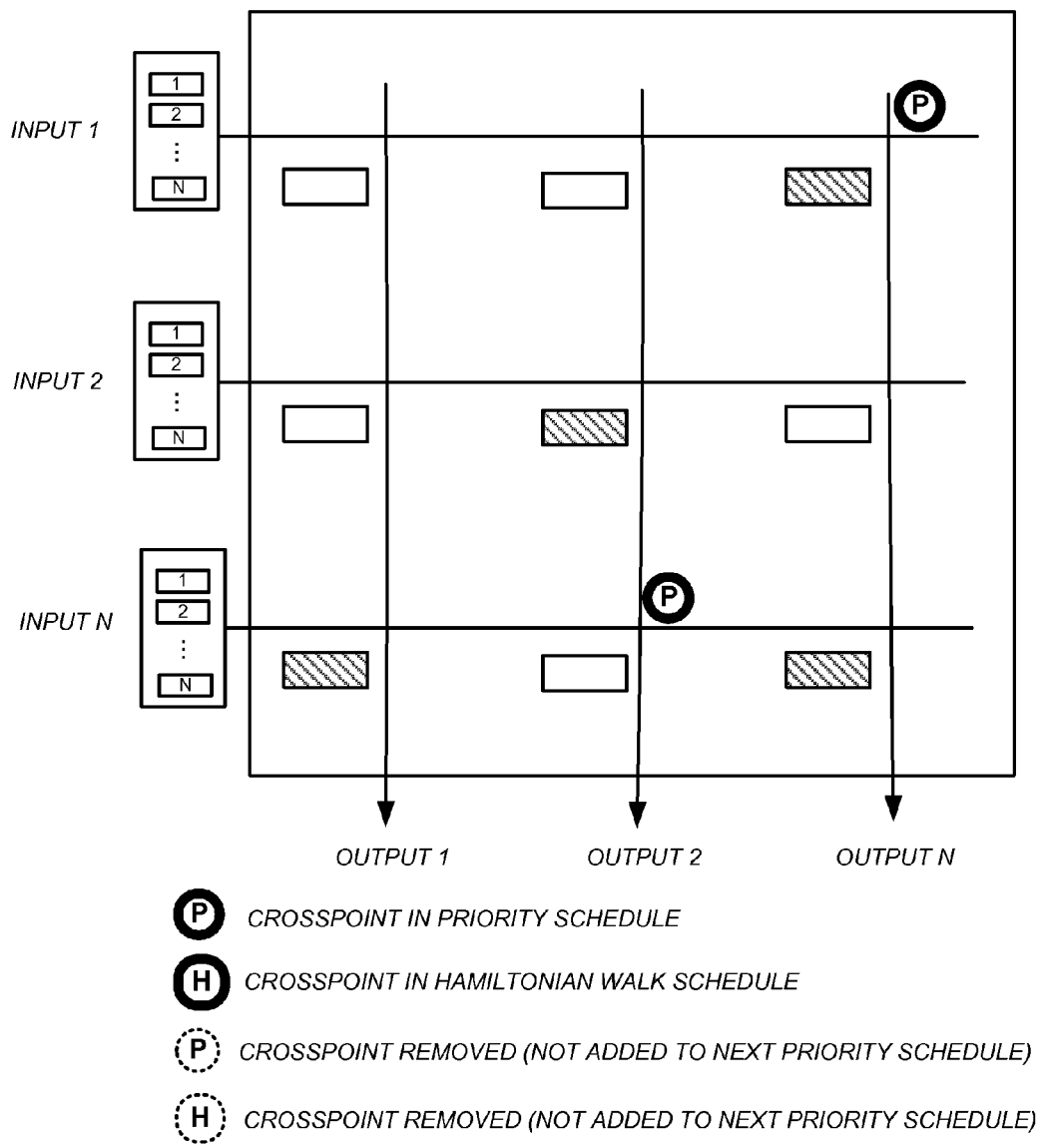

Referring first to FIG. 6A, the previous priority schedule includes crosspoint $(2,1)$ and the Hamiltonian walk schedule includes crosspoints $\{(1,3),(2,1),(3,2)\}$. Referring to both FIGS. 6A and 6B: for crosspoint $(1,3)$, it is assumed that condition (d) is met (though condition (e) could have been met) and this crosspoint is added to the updated priority schedule; for crosspoint $(2,1)$, it is assumed that condition (c) is met (though condition (b) could have been met) and this crosspoint is not added to the updated priority schedule; and for crosspoint $(3,2)$, it is assumed that condition (d) is met (though condition (e) could have been met) and this crosspoint is added to the updated priority schedule. The resulting updated priority schedule is shown in FIG. 6C.

Figure 6D:
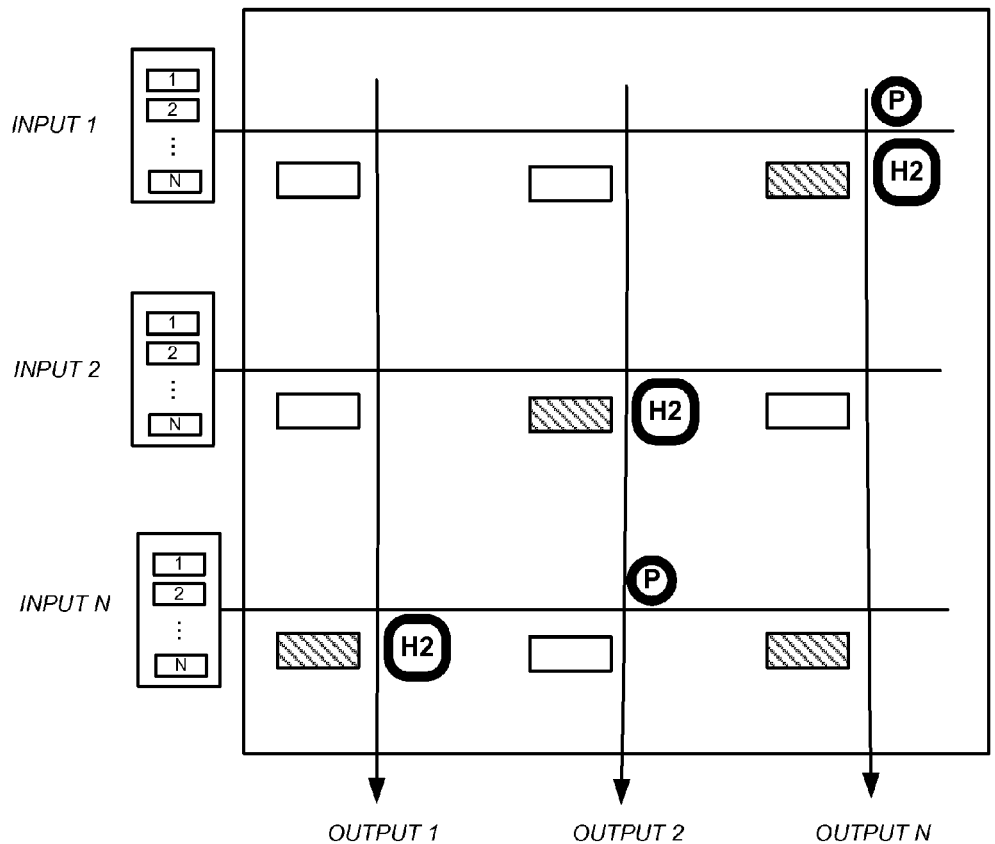
Figure 6E:
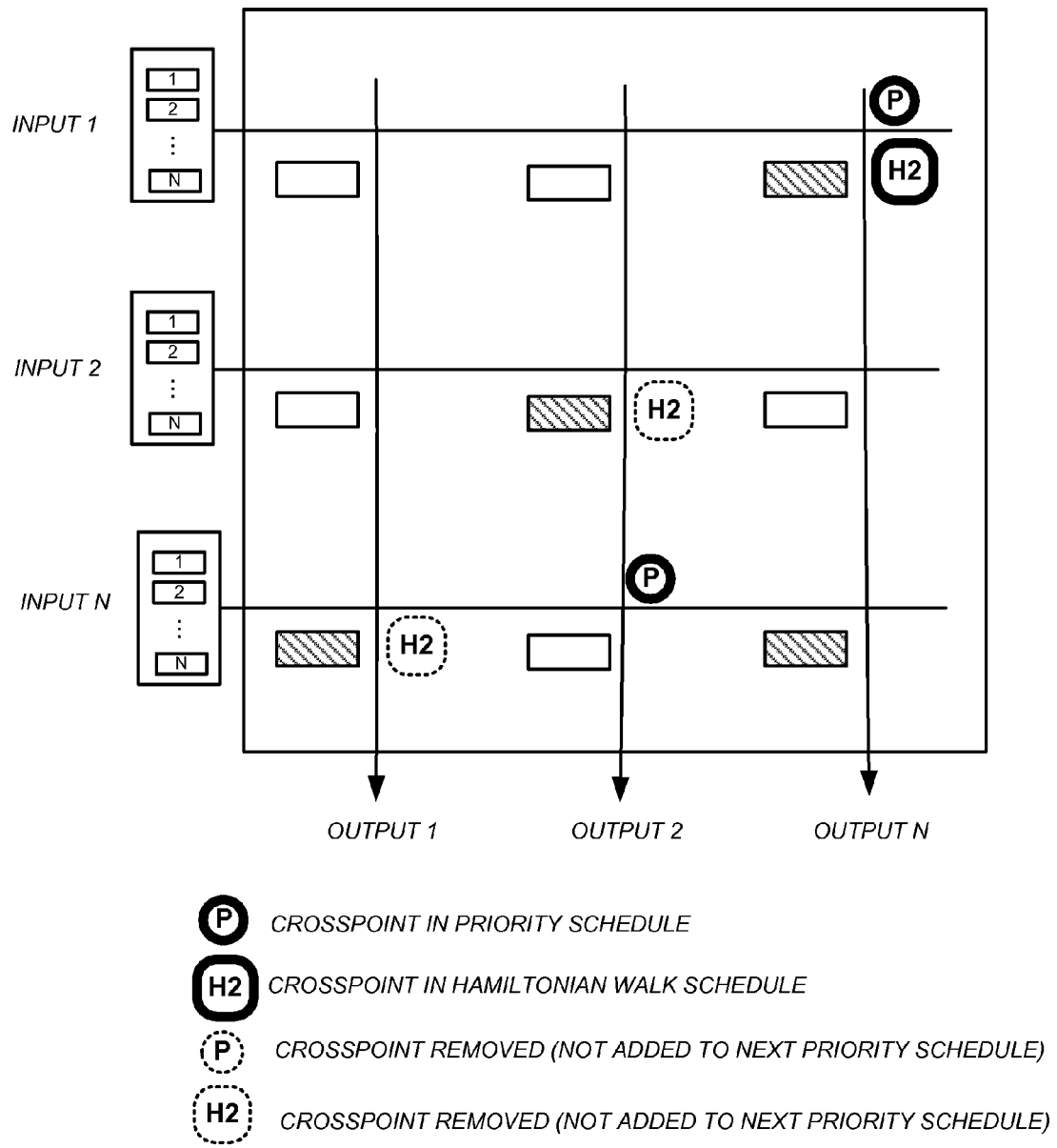
Figure 6F:
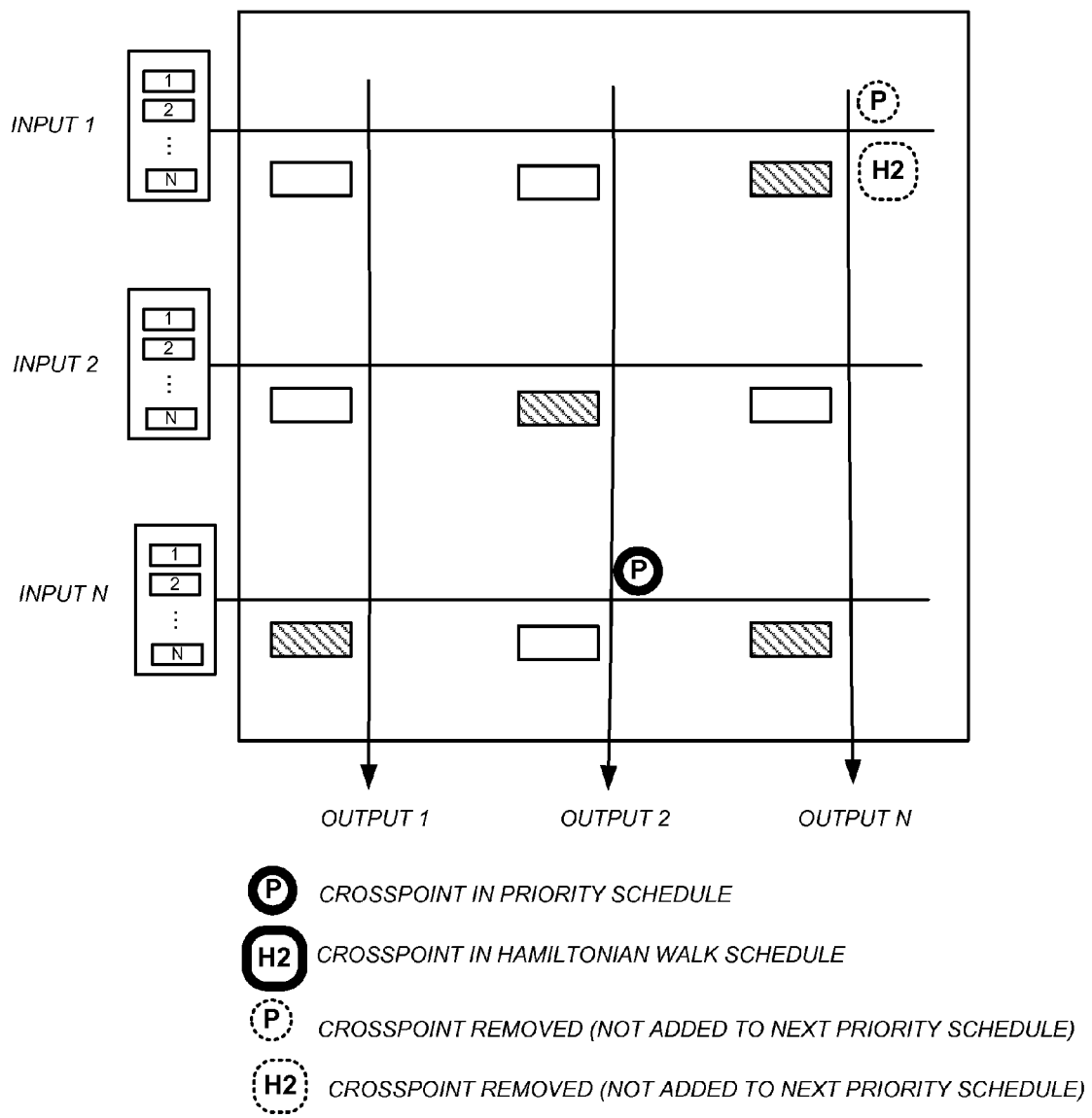
Figure 6G:
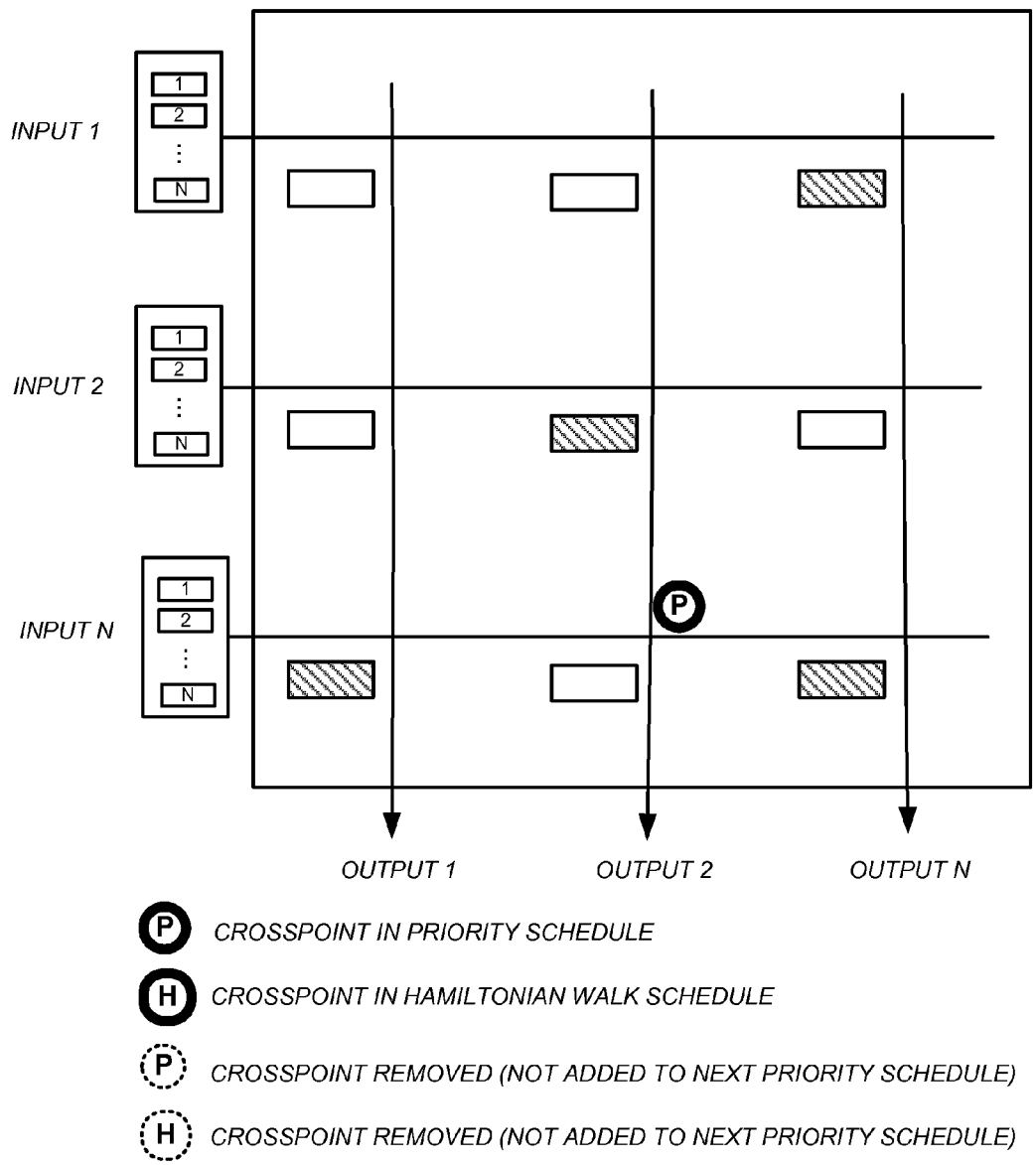

Now referring to FIG. 6D, the updated priority schedule includes crosspoints $\{(1,3),(3,2)\}$ and the Hamiltonian walk schedule includes crosspoints $\{(1,3),(2,2),(3,1)\}$. Referring to FIGS. 6E and 6F: for crosspoint $(1,3)$, it is assumed that condition (c) is met (though condition (b) could have been met) and this crosspoint is not added to the next updated priority schedule; for crosspoints $(2,2)$ and $(3,1)$, condition (f) is met and these crosspoints are not added to the next updated priority schedule; and for crosspoint $(3,2)$, condition (a) is met and this crosspoint remains in the next updated priority schedule. The result is shown in FIG. 6G.

FIGS. 7A-7F illustrate an example of operations of the exemplary distributed DISQUO scheduling process pseudo code set forth in §6.3.1 (and properties set forth in §6.3) above. Conditions (a)-(f) of the input pseudo code and conditions (a)-(e) of the output pseudo code are referenced. In these Figures, N=3.

Figure 7A:
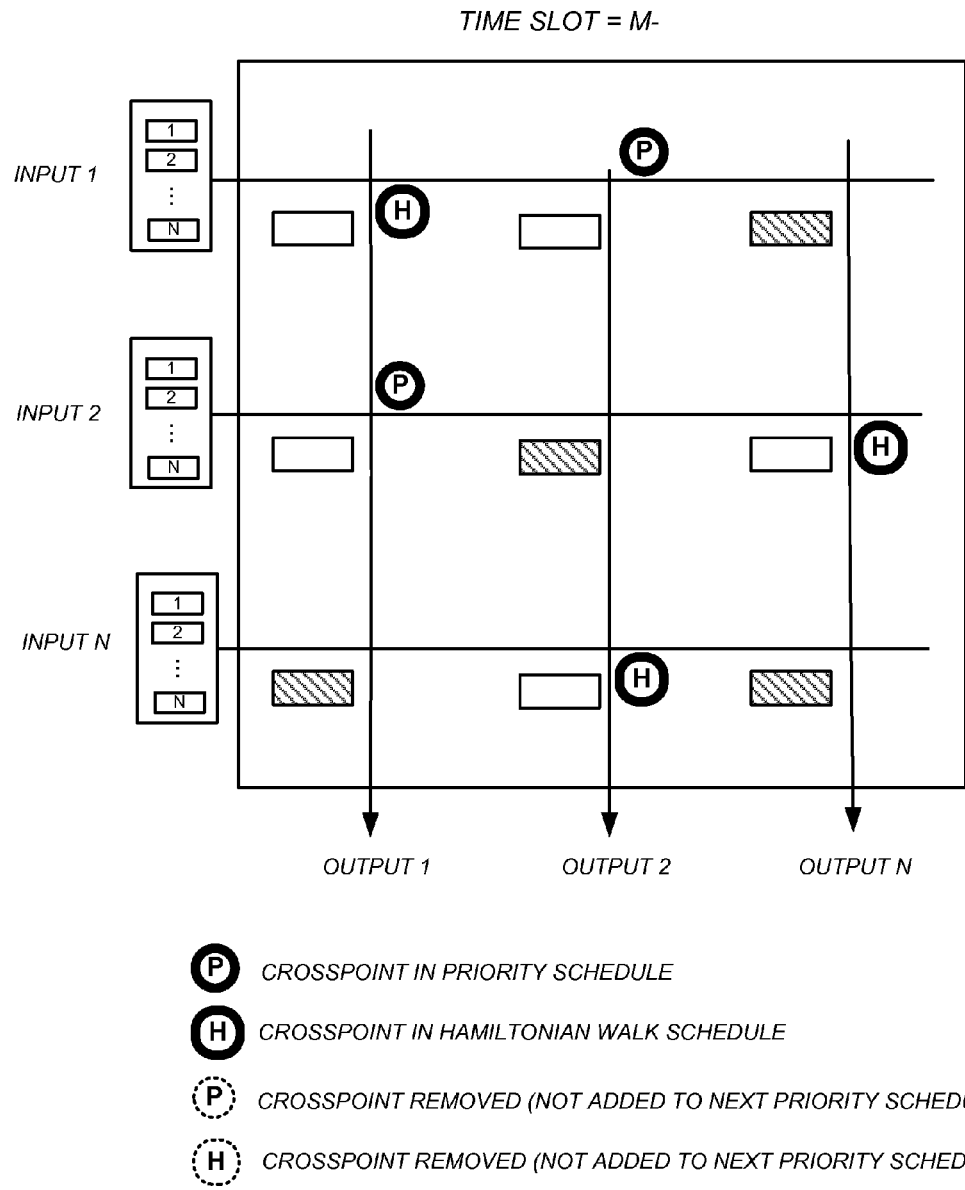

Referring to FIG. 7A, the initial priority schedule $(X(M-1))$ is $\{(1, 2), (2, 1)\}$ and the Hamiltonian walk schedule is $(H(M))$ is $\{(1, 1), (2, 3), (3, 2)\}$. Referring first to input 1: for crosspoint $(1, 1)$ condition (c) is met, and it is therefore not added to the next priority schedule $(X(M))$; and for crosspoint $(1, 2)$, $X_{12}(M-1)=1$ and so $X_{12}(M)=X_{12}(M-1)=1$ and this crosspoint is added to the next priority schedule $(X(M))$. Referring next to input 2: for crosspoint $(2,1)$, $X_{21}(M-1)=1$ and so $X_{21}(M)=X_{21}(M-1)=1$ and this crosspoint is added to the next priority schedule $(X(M))$; and for crosspoint $(2,3)$, condition (c) is met, and it is therefore not added to the next priority schedule. Finally, referring to input 3, this input knows that all of its other crosspoints are not selected, but does not know (but will learn) whether any of the crosspoint "neighbors" corresponding to output 2 are selected. In this example, it is assumed that condition (d) is met (though condition (c) could have been met).

Figure 7B:
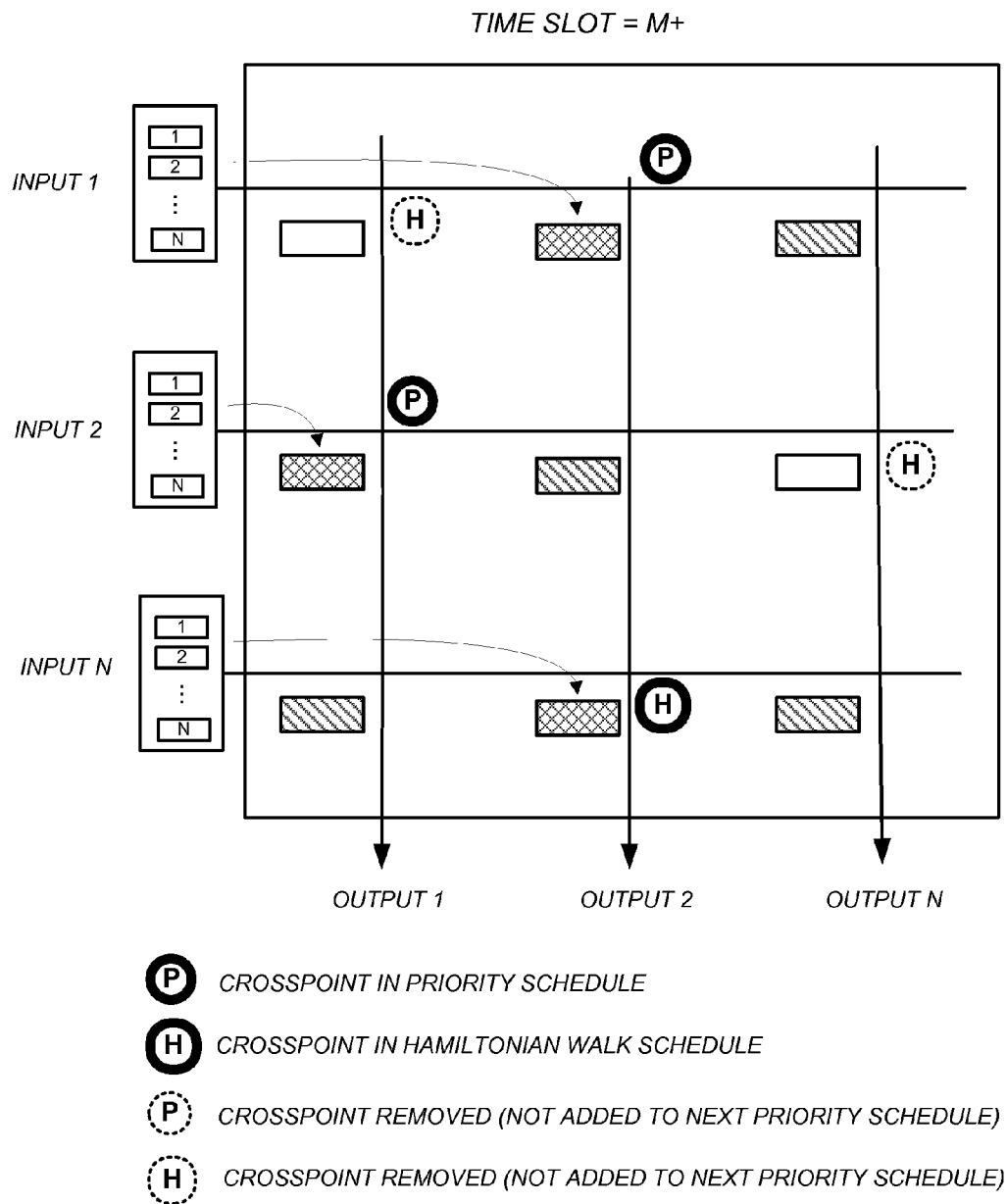

Referring to FIG. 7B, input 1 sends a cell to $CB_{1,2}$ (Recall property 2.), input 2 sends a cell to $CB_{2,1}$ (Recall property 2.), and input 3 sends a cell to $CB_{3,2}$ (Recall property 2.). Note that input 3 will observe $CB_{32}$ to see if output 2 is, in fact, "free". (However, since input 3 will observe this by the end of time M, and since output 2 is not free due to the scheduled "neighbor" crosspoint $(1,2)$, the packet in $CB_{32}$ will not be transmitted.) Thus, crosspoint $(3,2)$ will not be added to the updated priority schedule, as will be shown in FIGS. 7C and 7D.

Figure 7C:
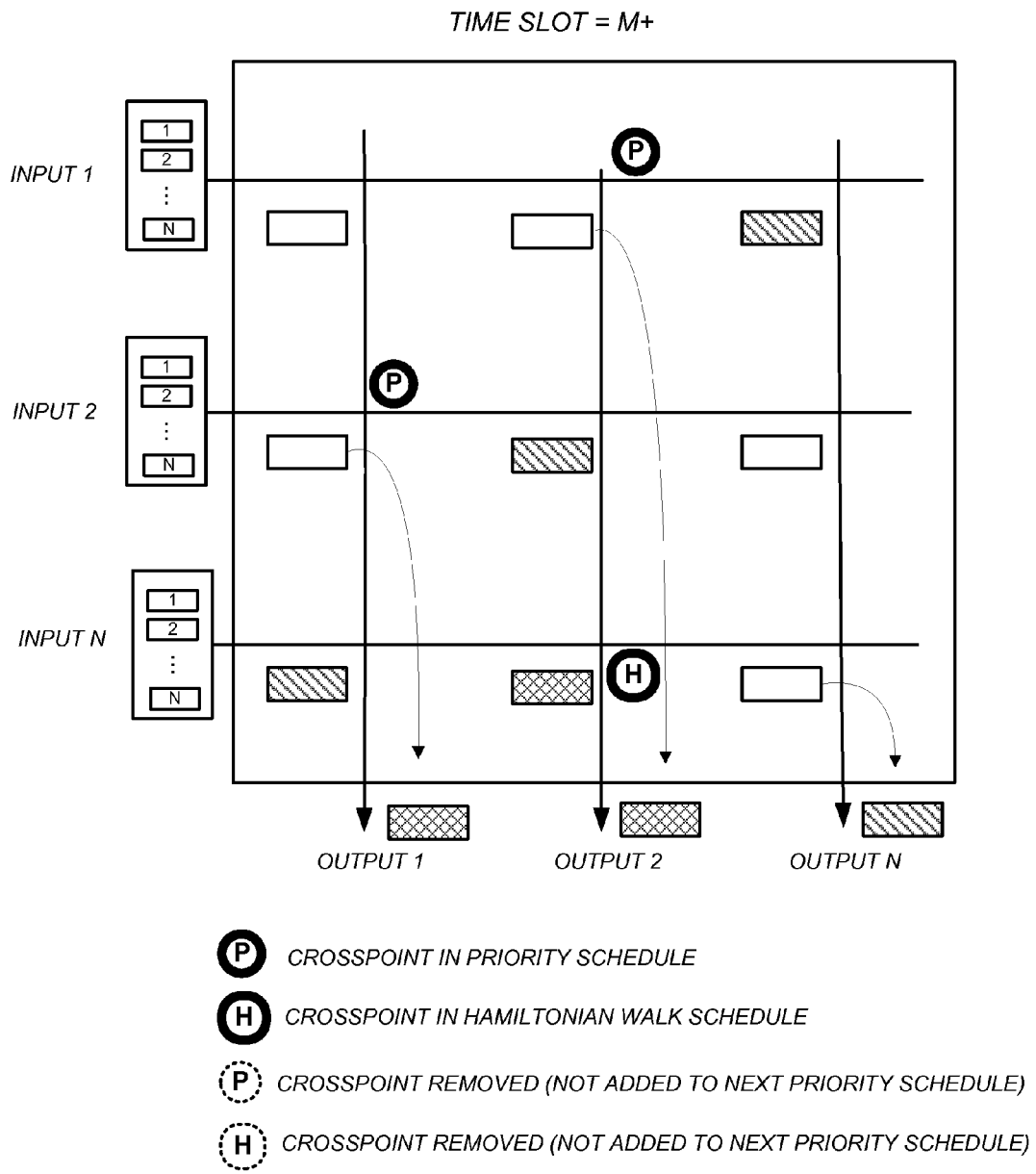

Referring to FIG. 7C, output 1 uses the priority schedule to transmit the cell from $CB_{2,1}$ (Recall property 2.); output 2 uses the priority schedule to transmit the cell from $CB_{1,2}$ (Recall property 2.); and output 3 is "free" and therefore chooses to transmit the cell from $CB_{3,3}$ randomly (Recall property 4.). Note that output 3 could have chosen to transmit the cell from $CB_{1,3}$. Further note that some other fair selection method might be used instead of random selection.

Figure 7D:
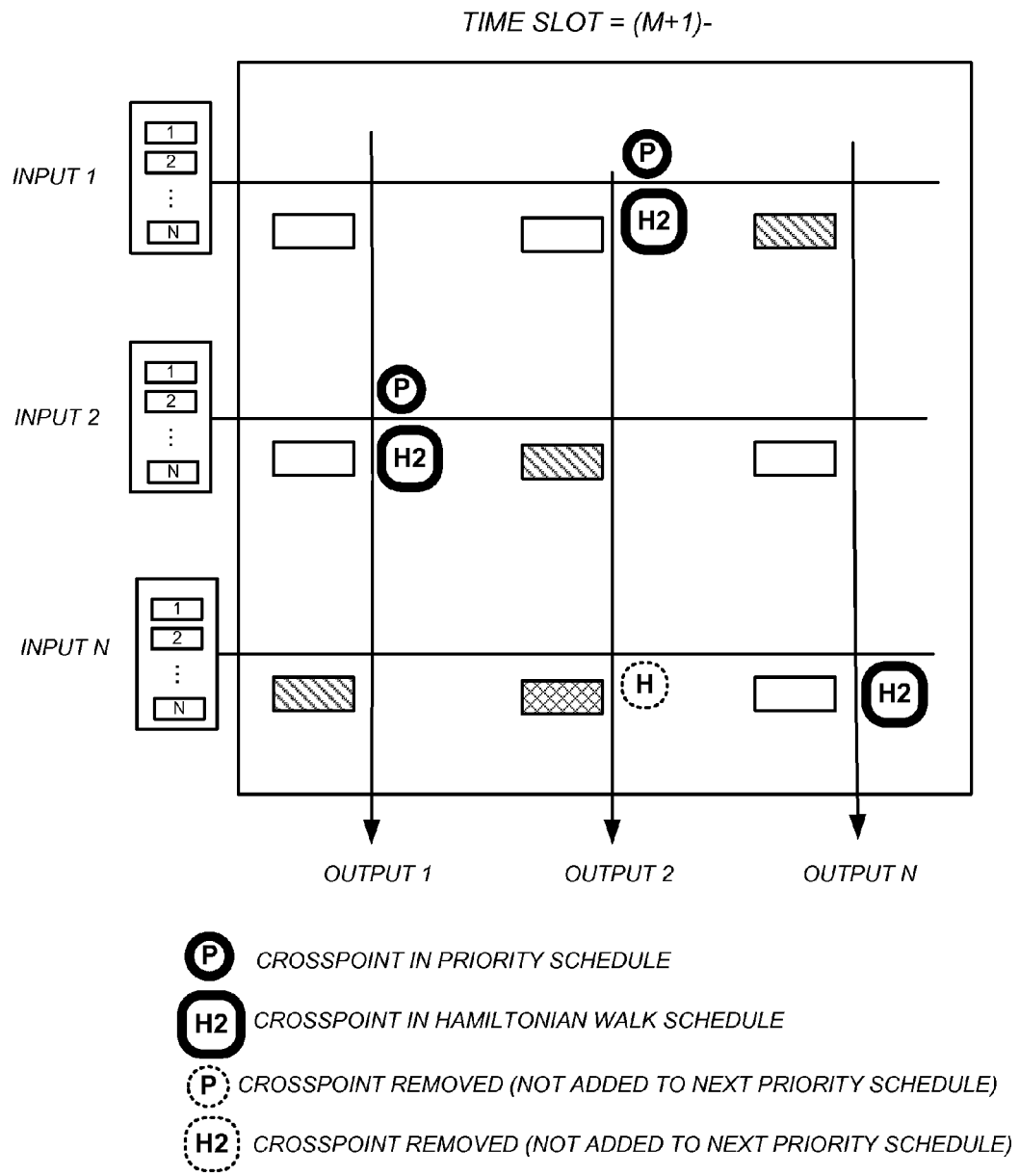

Referring to FIG. 7D, at the end of time slot (M) (or at the start of time slot (M+1)), the input 3 will learn that crosspoint $(3,2)$ did have a scheduled "neighbor". It can reach this conclusion since the cell at $CB_{3,2}$ was not transmitted (which would have been the case under property 4 if output 2 were, in fact, free). Thus, as shown in FIG. 7D, crosspoint $(3,2)$ is not added to the next priority schedule.

Figure 7E:
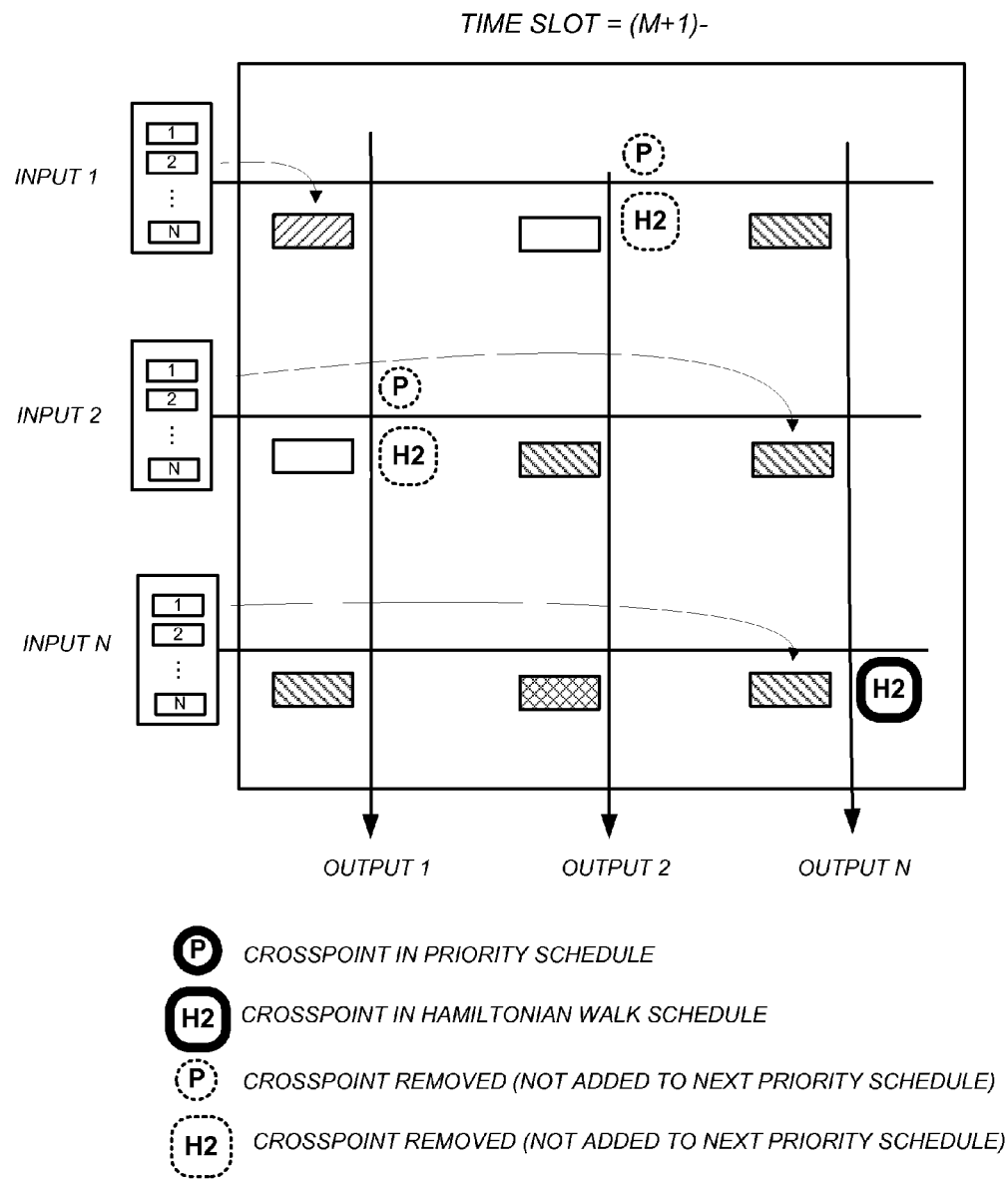

FIG. 7D also shows that the next Hamiltonian walk schedule $H(M+1)$ is $\{(1,2),(2,1),(3,3)\}$ Referring to both FIGS. 7D and 7E, at input 1, for crosspoint $(2,1)$ it is assumed that condition (b) is met (though condition (a) could have been met), and this crosspoint is not added to the next priority schedule. Similarly, at input 2, for crosspoint $(1,2)$ it is assumed that condition (b) is met (though condition (a) could have been met), and this crosspoint is not added to the next priority schedule. Finally, input 3 knows that all of its other crosspoints are not selected, but does not know (but will learn) whether the crosspoint "neighbors" corresponding to output 3 are selected. In this example, it is assumed, for now, that condition (d) is met (though condition (c) could have been met). (As will be described later with reference to FIG. 7F, the input 3 will learn that crosspoint $(3,3)$ actually had no "neighbors" selected and will therefore be added to the next priority schedule.)

Still referring to FIG. 7E, since input 1 is a "free input", it randomly sends a cell to free $CB_{1,1}$. (Recall property 3.) Similarly, since input 2 is a "free input", it randomly sends a cell to free $CB_{2,3}$. (Recall property 3.) Finally, input 3 sends a cell to $CB_{3,3}$. (Recall property 2.)

Figure 7F:
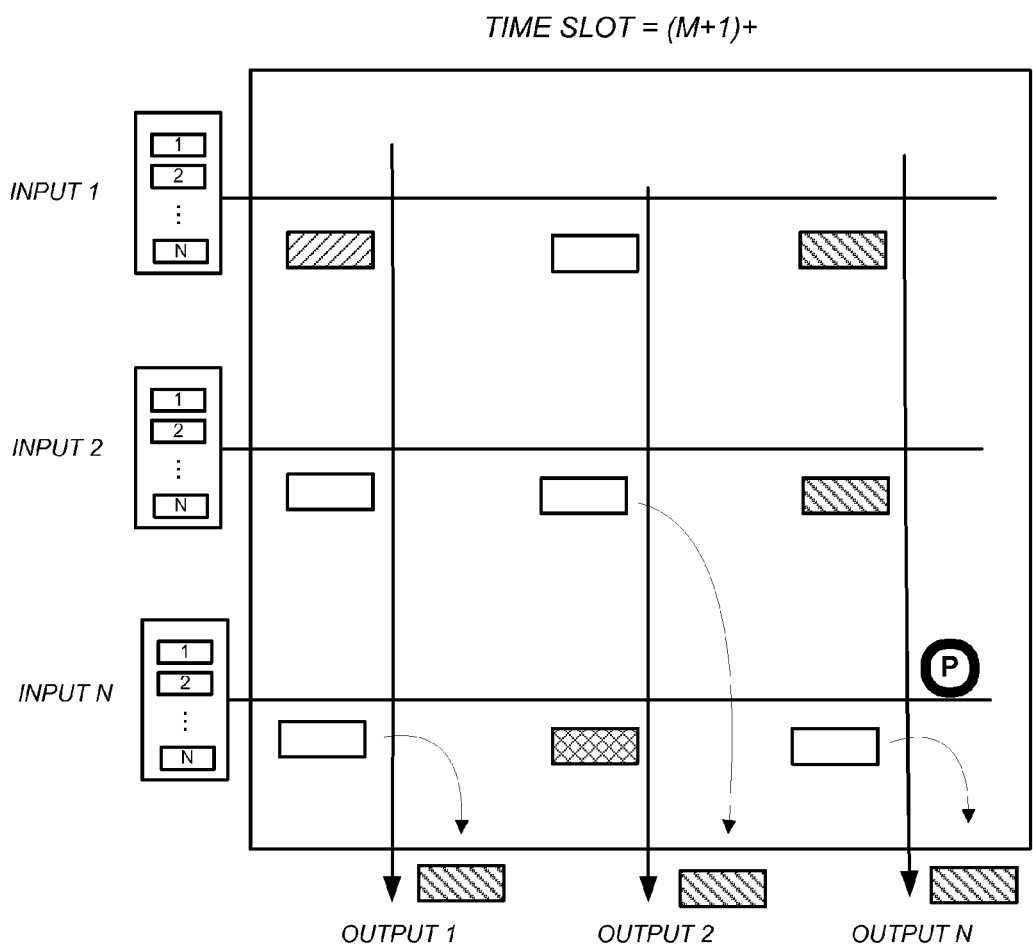

Referring to FIG. 7F, since outputs 1 and 2 are "free", they randomly choose and transmit the cells from $CB_{3,1}$ and $CB_{2,2}$, respectively. (Recall property 4.) Note that these outputs could have chosen to transmit the cell from another non-empty crosspoint buffer. Further note that some other fair selection method might be used instead of random selection. Output 3 transmits the cell from $CB_{3,3}$. (Recall property 2.) Furthermore, at the end of time slot (M+1) (or at the start of time slot (M+2)), the input 3 will learn that crosspoint $(3,3)$ had no "neighbors" selected/scheuled. It can reach this conclusion since the cell at $CB_{3,3}$ was transmitted. Thus, as shown in FIG. 7E, crosspoint $(3,3)$ is added to the next priority schedule.

§6.5 Characteristics of Exemplary Embodiments

The stationary distribution of an exemplary system is provided in Section IV of both the '229 and '207 provisional applications. Stability of the exemplary system is demonstrated in Section V of both the '229 and '207 provisional applications. Finally, simulation results of the exemplary system, which show its delay performance, are presented in Section VI in the '229 and '207 provisional applications.

§6.6 Conclusion

As can be appreciated from the foregoing, embodiments consistent with the present invention can provide scheduling for buffered crossbar switches with a crosspoint buffer size as small as one (and no speedup). The exemplary distributed scheduling process achieves 100% throughput for any admissible Bernoulli arrival traffic. Simulation results also showed that this distributed scheduling process can provide very good delay performance for different traffic patterns. The simulation results also showed that packet delay is very weakly dependent on the switch size, which implies that the exemplary distributed scheduling algorithm can scale with the number of switch ports.

What is claimed is:

1. A processor-implemented scheduling method for use in a buffered crossbar switch having
   a plurality of output ports,
   a plurality of input ports, each of the plurality of input ports having a virtual output queue corresponding to each of the plurality of output ports, and
   a switch fabric coupling each of the input ports with each of the output ports, defining crosspoints and including a buffer in the switch fabric at each input port-output port crosspoint,
the processor-implemented scheduling method comprising:
   a) accepting an initial priority schedule which defines, for each input port i-output port j crosspoint$_{i,j}$, whether the crosspoint$_{i,j}$ is in the initial priority schedule or not, wherein,
      1) for each input port i, there is at most one crosspoint$_{i,j}$ scheduled in the initial priority schedule, and
      2) for each output port j, there is at most one crosspoint$_{i,j}$ scheduled in the initial priority schedule;
   b) generating or receiving a Hamiltonian walk schedule which defines, for each input port i-output port j crosspoint$_{i,j}$, whether the crosspoint$_{i,j}$ is in the Hamiltonian walk schedule or not; and
   c) merging the initial priority schedule with the Hamiltonian walk schedule to define an updated priority schedule such that:
      1) for each crosspoint$_{i,j}$ that is not in the Hamiltonian walk schedule, maintaining a value of the crosspoint$_{i,j}$ in the updated priority schedule as that value of the corresponding crosspoint$_{i,j}$ in the initial priority schedule, and
      2) for each crosspoint$_{i,j}$ that is in the Hamiltonian walk schedule,
         A) determining whether or not the crosspoint$_{i,j}$ belongs to the initial priority schedule,
         B) responsive to a determination that the crosspoint$_{i,j}$ does belong to the initial priority schedule, determining whether or not to maintain the crosspoint$_{i,j}$ in the updated priority schedule based on an occupancy of the $j^{th}$ virtual output queue corresponding to the input port i, and
         C) responsive to a determination that the crosspoint$_{i,j}$ does not belong to the initial priority schedule,
            i) determining whether or not any neighbor crosspoints$_{k,l}$ of crosspoint$_{i,j}$ belong to the initial priority schedule,
            ii) responsive to a determination that a neighbor crosspoint$_{k,l}$ of the crosspoint$_{i,j}$ belongs to the initial priority schedule, determining whether or not to add the crosspoint$_{i,j}$ to the updated priority schedule based on an occupancy of the $j^{th}$ virtual output queue corresponding to the input port i, and
            iii) responsive to a determination that a neighbor crosspoint$_{k,l}$ of the crosspoint$_{i,j}$ does not belong to the initial priority schedule, excluding the crosspoint$_{i,j}$ from the updated priority schedule.

2. The method of claim 1 wherein each crosspoint buffer is a single cell buffer.

3. The method of claim 1 wherein a crosspoint is a neighbor of crosspoint$_{i,j}$ if the crosspoint has the same input port i but a different output port $\bar{j}$ than the output port j, or the same output port j but a different input port $\bar{i}$ than the input port i.

4. The method of claim 1 wherein the act of determining whether or not to add the crosspoint$_{i,j}$ in the updated priority schedule based on the occupancy of the $j^{th}$ virtual output queue corresponding to the input port i,
   determines a weight of the $j^{th}$ virtual output queue corresponding to the input i as a function of the occupancy of the queue,
   determines a probability $$p_{i,j} = \frac{e^{weight_{i,j}}}{1 + e^{weight_{i,j}}},$$

and
   adds the crosspoint$_{i,j}$ to the updated priority schedule with a probability $p_{i,j}$, and otherwise does not add crosspoint$_{i,j}$ to the updated priority schedule.

5. The method of claim 1 wherein the act of determining whether or not to add the crosspoint$_{i,j}$ to the updated priority schedule based on the occupancy of the $j^{th}$ virtual output queue corresponding to the input port i,
   determines a probability $p_{i,j}$ as a concave function of the occupancy of the $j^{th}$ virtual output queue corresponding to the input i
   adds the crosspoint$_{i,j}$ to the updated priority schedule with a probability $p_{i,j}$, and otherwise does not add the crosspoint$_{i,j}$ to the updated priority schedule.

6. The method of claim 1 further comprising:
   d) generating or receiving a second Hamiltonian walk schedule which defines, for each input port i-output port j crosspoint$_{i,j}$, whether the crosspoint$_{i,j}$ is in the second Hamiltonian walk schedule or not; and
   e) merging the updated priority schedule with the second Hamiltonian walk schedule to define a further updated priority schedule such that:
      1) for each crosspoint$_{i,j}$ that is not in the second Hamiltonian walk schedule, maintaining a value of the crosspoint$_{i,j}$ in the further updated priority schedule as that value of the corresponding crosspoint$_{i,j}$ in the updated priority schedule, and
      2) for each crosspoint$_{i,j}$ that is in the second Hamiltonian walk schedule,
         A) determining whether or not the crosspoint$_{i,j}$ belongs to the updated priority schedule,
         B) responsive to a determination that the crosspoint$_{i,j}$ does belong to the updated priority schedule, determining whether or not to maintain the crosspoint$_{i,j}$ in the further updated priority schedule based on an occupancy of the $j^{th}$ virtual output queue corresponding to the input port i, and C) responsive to a determination that the crosspoint$_{i,j}$ does not belong to the updated priority schedule,
  i) determining whether or not any neighbor crosspoints$_{k,l}$ of crosspoint$_{i,j}$ belong to the updated priority schedule,
  ii) responsive to a determination that a neighbor crosspoint$_{k,l}$ of the crosspoint$_{i,j}$ belongs to the updated priority schedule, determining whether or not to add the crosspoint$_{i,j}$ to the further updated priority schedule based on an occupancy of the j$^{th}$ virtual output queue corresponding to the input port i, and
  iii) responsive to a determination that a neighbor crosspoint$_{k,l}$ of the crosspoint$_{i,j}$ does not belong to the updated priority schedule, excluding the crosspoint$_{i,j}$ from the further updated priority schedule.

7. The method of claim 1 wherein a delay characteristic of the switch is independent of switch size.

8. The method of claim 1 wherein each crosspoint buffer is a multi-cell buffer.

9. A distributed processor-implemented scheduling method for use in a buffered crossbar switch having
  a plurality of output ports,
  a plurality of input ports, each of the plurality of input ports having a virtual output queue corresponding to each of the plurality of output ports, and
  a switch fabric coupling each of the input ports with each of the output ports, defining crosspoints and including a buffer in the switch fabric at each input port-output port crosspoint,
the distributed processor-implemented scheduling method comprising:
  a) generating or receiving a Hamiltonian walk schedule which defines, for each input port i-output port j crosspoint$_{i,j}$, whether the crosspoint$_{i,j}$ is in the Hamiltonian walk schedule or not; and
  b) at each input port i, and for each crosspoint$_{i,j}$ that is in the Hamiltonian walk schedule,
    1) accepting an initial priority schedule which defines, for each input port i-output port j crosspoint$_{i,j}$, whether the crosspoint$_{i,j}$ is in the initial priority schedule or not, wherein,
      i) for each input port i, there is at most one crosspoint$_{i,j}$ scheduled in the initial priority schedule, and
      ii) for each output port j, there is at most one crosspoint$_{i,j}$ scheduled in the initial priority schedule,
    2) accepting the Hamiltonian walk schedule,
    3) determining whether any crosspoint corresponding to input port i was set in the initial priority schedule,
    4) responsive to a determination that there was a crosspoint corresponding to input port i that was set in the initial priority schedule,
      A) determining whether the crosspoint$_{i,j}$ is also in the initial priority schedule,
      B) responsive to a determination that the crosspoint$_{i,j}$ does belong to the initial priority schedule, determining whether or not to maintain the crosspoint$_{i,j}$ in an updated priority schedule based on an occupancy of the j$^{th}$ virtual output queue corresponding to the input port i, and
      C) responsive to a determination that the crosspoint$_{i,j}$ does not belong to the initial priority schedule, determining to not include the crosspoint$_{i,j}$ in the updated priority schedule, and
    5) responsive to a determination that there was no crosspoint corresponding to input port i that was set in the initial priority schedule, such that input port i is a free input,
      A) determining whether or not any neighbor crosspoints$_{k,l}$ of a crosspoint$_{i,j}$ belong to the initial priority schedule,
      B) responsive to a determination that no neighbor crosspoint$_{k,l}$ of the crosspoint$_{i,j}$ belongs to the initial priority schedule, determining whether or not to add the crosspoint$_{i,j}$ to the updated priority schedule based on an occupancy of the j$^{th}$ virtual output queue corresponding to the input port i, and
      C) responsive to a determination that there is a neighbor crosspoint$_{k,l}$ of the crosspoint$_{i,j}$ that belongs to the initial priority schedule, excluding the crosspoint$_{i,j}$ from the updated priority schedule; and
  c) at each output port j, and for each crosspoint$_{i,j}$ that is in the Hamiltonian walk schedule,
    1) accepting the initial priority schedule,
    2) accepting the Hamiltonian walk schedule,
    3) determining whether any crosspoint corresponding to output port j was set in the initial priority schedule,
    4) responsive to a determination that there was a crosspoint corresponding to output port j that was set in the initial priority schedule,
      A) determining whether the crosspoint$_i$ is also in the initial priority schedule,
      B) responsive to a determination that the crosspoint$_{i,j}$ is also in the initial priority schedule,
        i) observing a state of a crosspoint buffer corresponding to the crosspoint that was set in the initial priority schedule to determine whether the corresponding input port transmitted a cell to the crosspoint buffer at the start of a current time slot,
        ii) responsive to a determination that the corresponding input port did transmit a cell to the crosspoint buffer at the start of the current time slot, adding the crosspoint buffer to the updated priority schedule, and
        iii) responsive to a determination that the corresponding input port did not transmit a cell to the crosspoint buffer at the start of the current time slot, not adding the crosspoint buffer to the updated priority schedule,
      C) responsive to a determination that the crosspoint$_{i,j}$ was not also in the initial priority schedule, not adding the crosspoint$_{i,j}$ to the updated priority schedule;
    5) responsive to a determination that there was no crosspoint corresponding to output port j set in the initial priority schedule, such that the output port j is a free output port,
      A) observing a state of each of the crosspoint buffers corresponding to the output port j to determine whether a cell is stored in any of the crosspoint buffers,
      B) responsive to a determination that a crosspoint buffer is storing a cell, transmitting the cell from the crosspoint buffer,
      C) responsive to a determination that a crosspoint buffer is not storing a cell, continuing to observe a state of each of the crosspoint buffers corresponding to the output port j to determine whether a cell is transmitted to any of the crosspoint buffers at the start of the next time slot, and D) responsive to a determination that a cell is transmitted to a crosspoint buffer at the start of the next time slot, adding the crosspoint corresponding to the crosspoint buffer receiving the cell at the next time slot to the updated priority schedule, otherwise, not adding a crosspoint corresponding to any crosspoint buffers not receiving a cell in the next time slot to the updated priority schedule.

10. The method of claim 9 wherein each crosspoint buffer is a single cell buffer.

11. The method of claim 9 wherein a crosspoint is a neighbor of crosspoint$_{i,j}$ if the crosspoint has the same input port i but a different output port $\bar{j}$ than the output port j, or the same output port j but a different input port $\bar{i}$ than the input port i.

12. The method of claim 9 wherein the act of determining whether or not to add the crosspoint$_{i,j}$ in the updated priority schedule based on the occupancy of the $j^{th}$ virtual output queue corresponding to the input port i, determines a weight of the $j^{th}$ virtual output queue corresponding to the input i as a function of the occupancy of the queue, determines a probability $$p_{i,j} = \frac{e^{weight_{i,j}}}{1 + e^{weight_{i,j}}},$$

and adds the crosspoint$_{i,j}$ to the updated priority schedule with a probability $p_{i,j}$, and otherwise does not add crosspoint$_{i,j}$ to the updated priority schedule.

13. The method of claim 9 wherein the act of determining whether or not to add the crosspoint$_{i,j}$ to the updated priority schedule based on the occupancy of the $j^{th}$ virtual output queue corresponding to the input port i, determines a probability $p_{i,j}$ as a concave function of the occupancy of the $j^{th}$ virtual output queue corresponding to the input i adds the crosspoint$_{i,j}$ to the updated priority schedule with a probability $p_{i,j}$, and otherwise does not add the crosspoint$_{i,j}$ to the updated priority schedule.

14. The method of claim 10 wherein a delay characteristic of the switch is independent of switch size.

15. The method of claim 10 wherein each crosspoint buffer is a multi-cell buffer.

16. For use in a buffered crossbar switch having a plurality of output ports, a plurality of input ports, each of the plurality of input ports having a virtual output queue corresponding to each of the plurality of output ports, and a switch fabric coupling each of the input ports with each of the output ports, defining crosspoints and including a buffer in the switch fabric at each input port-output port crosspoint, a scheduler comprising:

a) means for accepting an initial priority schedule which defines, for each input port i-output port j crosspoint$_{i,j}$, whether the crosspoint$_{i,j}$ is in the initial priority schedule or not, wherein, i) for each input port i, there is at most one crosspoint$_{i,j}$ scheduled in the initial priority schedule, and ii) for each output port j, there is at most one crosspoint$_{i,j}$ scheduled in the initial priority schedule;

b) means for generating or receiving a Hamiltonian walk schedule which defines, for each input port i-output port j crosspoint$_{i,j}$, whether the crosspoint$_{i,j}$ is in the Hamiltonian walk schedule or not; and c) means for merging the initial priority schedule with the Hamiltonian walk schedule to define an updated priority schedule such that:

1) for each crosspoint$_{i,j}$ that is not in the Hamiltonian walk schedule, maintaining a value of the crosspoint$_{i,j}$ in the updated priority schedule as that value of the corresponding crosspoint$_{i,j}$ in the initial priority schedule, and 2) for each crosspoint$_{i,j}$ that is in the Hamiltonian walk schedule, A) determining whether or not the crosspoint$_{i,j}$ belongs to the initial priority schedule, B) responsive to a determination that the crosspoint$_{i,j}$ does belong to the initial priority schedule, determining whether or not to maintain the crosspoint$_{i,j}$ in the updated priority schedule based on an occupancy of the $j^{th}$ virtual output queue corresponding to the input port i, and C) responsive to a determination that the crosspoint$_{i,j}$ does not belong to the initial priority schedule, i) determining whether or not any neighbor crosspoints$_{k,l}$ of crosspoint$_{i,j}$ belong to the initial priority schedule, ii) responsive to a determination that a neighbor crosspoint$_{k,l}$ of the crosspoint$_{i,j}$ belongs to the initial priority schedule, determining whether or not to add the crosspoint$_{i,j}$ to the updated priority schedule based on an occupancy of the $j^{th}$ virtual output queue corresponding to the input port i, and iii) responsive to a determination that a neighbor crosspoint$_{k,l}$ of the crosspoint$_{i,j}$ does not belong to the initial priority schedule, excluding the crosspoint$_{i,j}$ from the updated priority schedule.

17. The scheduler of claim 16 wherein a delay characteristic of the switch is independent of switch size.

18. The scheduler of claim 16 wherein each crosspoint buffer is a single cell buffer.

19. The scheduler of claim 16 wherein each crosspoint buffer is a multi-cell buffer.

* * * * *